(12) United States Patent
Konegawa et al.

(10) Patent No.: US 11,022,768 B2
(45) Date of Patent: Jun. 1, 2021

(54) OPTO-ELECTRIC HYBRID BOARD AND OPTO-ELECTRIC HYBRID BOARD ASSEMBLY

(71) Applicant: NITTO DENKO CORPORATION, Osaka (JP)

(72) Inventors: Naoto Konegawa, Osaka (JP); Yuichi Tsujita, Osaka (JP); Naoyuki Tanaka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/495,984

(22) PCT Filed: Mar. 29, 2018

(86) PCT No.: PCT/JP2018/013193
§ 371 (c)(1),
(2) Date: Sep. 20, 2019

(87) PCT Pub. No.: WO2018/181693
PCT Pub. Date: Oct. 4, 2018

(65) Prior Publication Data
US 2020/0150359 A1  May 14, 2020

(30) Foreign Application Priority Data
Mar. 31, 2017  (JP) .............................. JP2017-070902

(51) Int. Cl.
*G02B 6/42*  (2006.01)

(52) U.S. Cl.
CPC .............. *G02B 6/428* (2013.01); *G02B 6/42* (2013.01); *G02B 6/4214* (2013.01); *G02B 6/4251* (2013.01)

(58) Field of Classification Search
CPC ....... G02B 6/42; G02B 6/4214; G02B 6/4251; G02B 6/428
See application file for complete search history.

(56) References Cited

U.S. PATENT DOCUMENTS 6,834,133 B1   12/2004   Towle et al.
9,244,233 B2 *  1/2016   Tseng .................... G02B 6/428
(Continued)

FOREIGN PATENT DOCUMENTS

| JP | 2005-309008 A | 11/2005 |
| JP | 2010-147359 A | 7/2010 |

(Continued)

OTHER PUBLICATIONS

International Preliminary Report on Patentability issued by WIPO dated Oct. 1, 2019, in connection with International Patent Application No. PCT/JP2018/013193.
(Continued)

*Primary Examiner* — Daniel Petkovsek
(74) *Attorney, Agent, or Firm* — Edwards Neils LLC; Jean C. Edwards, Esq.

(57) ABSTRACT

An opto-electric hybrid board includes an optical waveguide and an electric circuit board. The opto-electric hybrid board has an electrode at one end portion in a first direction perpendicular to the thickness direction, and optically and electrically connects an optical element emitting light from a space between the one end portion and the other end portion. The electric circuit board includes a terminal portion electrically connected to the electrode and a support portion that supports the other end portion. The optical waveguide includes a light receiving portion for receiving light emitted from the optical element, which is positioned between the terminal portion and the support portion, when projected in the thickness direction, and a one-side surface in the thickness direction of the terminal portion is posi- (Continued)

tioned at the other side in the thickness direction with respect to a one-side surface in the thickness direction of the support portion.

8 Claims, 15 Drawing Sheets

(56) References Cited

U.S. PATENT DOCUMENTS

| | | | | |
|---|---|---|---|---|
| 9,671,575 | B2* | 6/2017 | Yamamoto | G02B 6/4214 |
| 9,703,057 | B2* | 7/2017 | Tsujita | H05K 1/0274 |
| 10,288,823 | B2* | 5/2019 | Tsujita | G02B 6/032 |
| 2005/0201694 | A1* | 9/2005 | Rosinski | G02B 6/4214 |
| | | | | 385/92 |
| 2010/0158067 | A1 | 6/2010 | Nakatsuka et al. | |
| 2013/0182997 | A1* | 7/2013 | Fujiwara | G02B 6/4214 |
| | | | | 385/14 |
| 2013/0243376 | A1 | 9/2013 | Choraku et al. | |
| 2014/0314373 | A1 | 10/2014 | Tseng | |
| 2016/0216464 | A1 | 7/2016 | Tsujita et al. | |
| 2016/0313517 | A1 | 10/2016 | Yamamoto | |

FOREIGN PATENT DOCUMENTS

| | | |
|---|---|---|
| JP | 2012-247732 A | 12/2012 |
| JP | 2013-195642 A | 9/2013 |
| JP | 2015-087741 A | 5/2015 |
| JP | 2016-106237 A | 6/2016 |
| JP | 2016-206377 A | 12/2016 |

OTHER PUBLICATIONS

International Search Report Issued in PCT/JP2018/013193 dated Jun. 26, 2018.

Written Opinion Issued in PCT/JP2018/013193 dated Jun. 26, 2018.

Office Action, issued by the Japanese Patent Office dated Feb. 16, 2021, in connection with Japanese Patent Application No. 2017-070902.

Office Action, issued by the State Intellectual Property Office of China dated Dec. 24, 2020, in connection with Chinese Patent Application No. 201880022818.X.

* cited by examiner

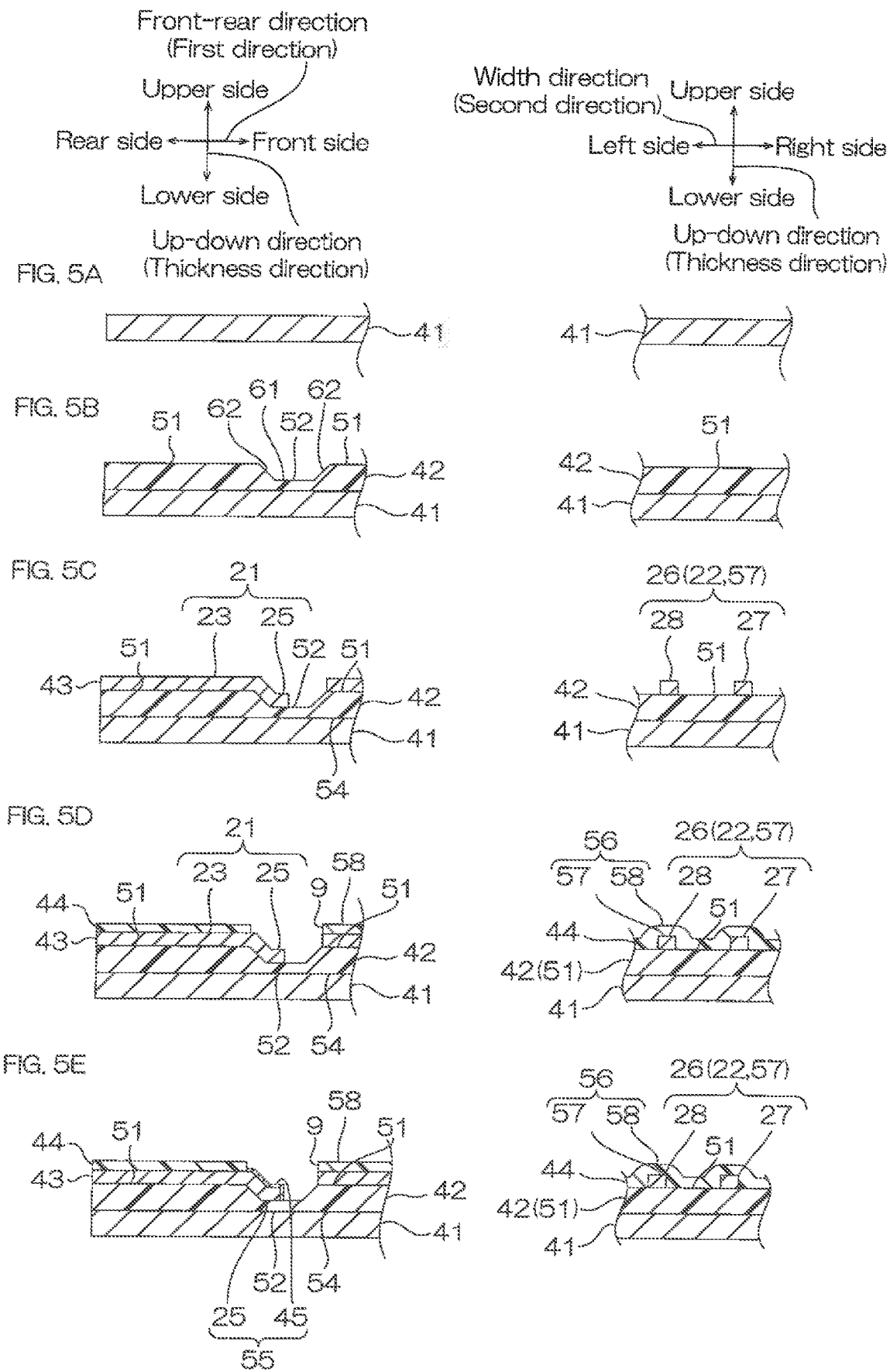

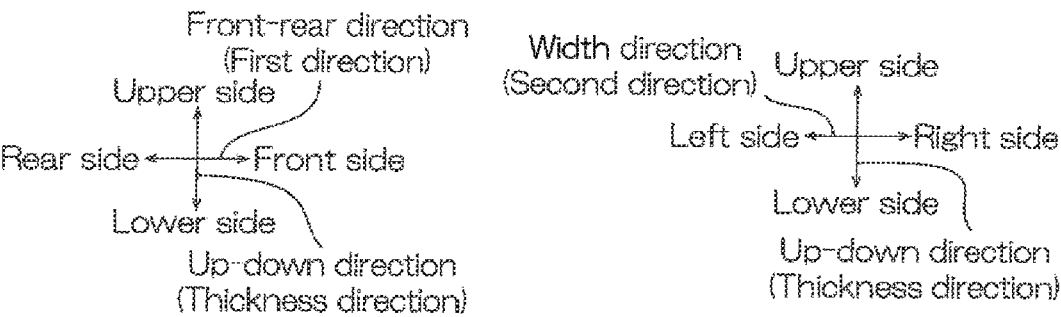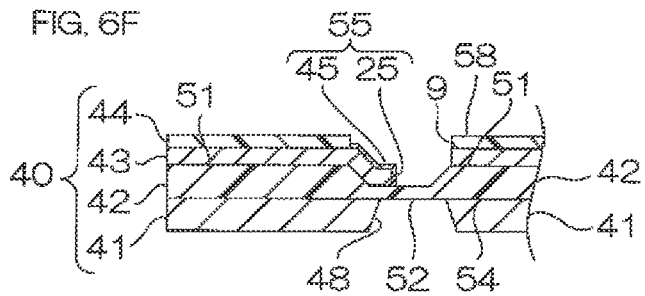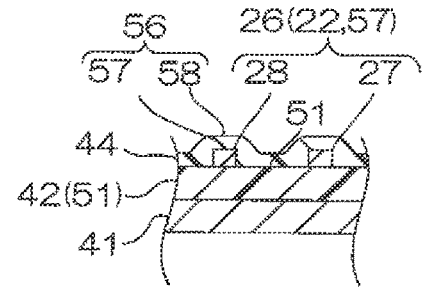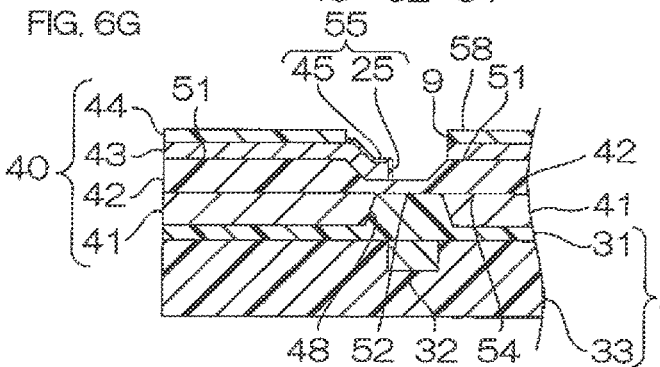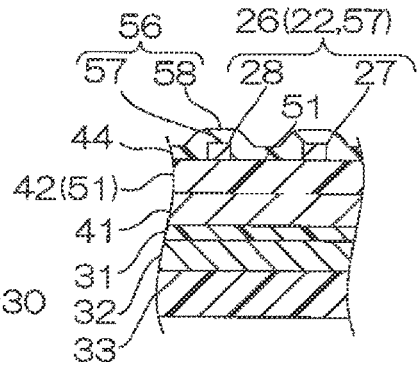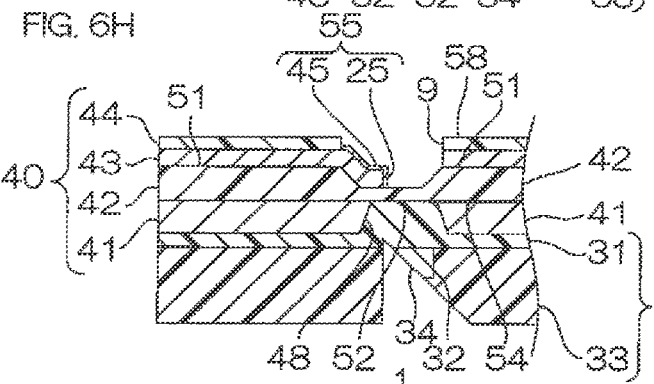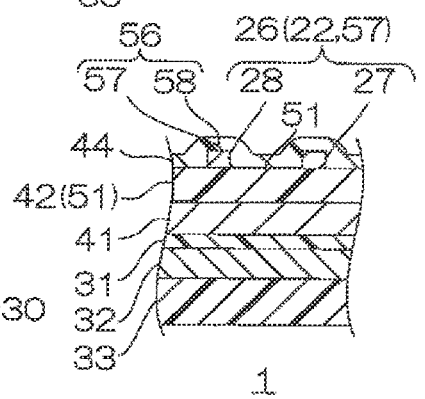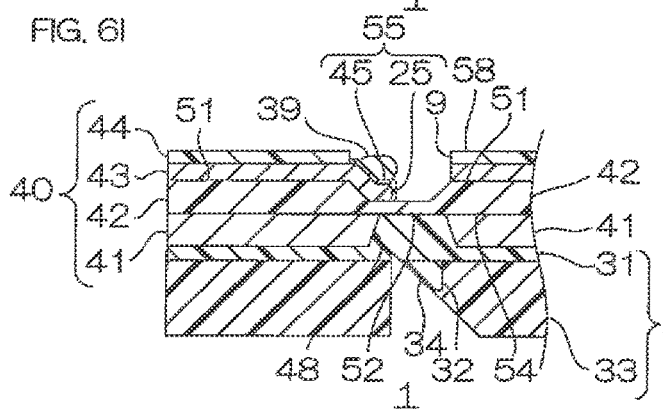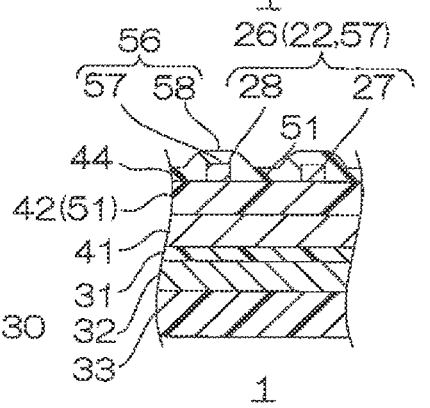

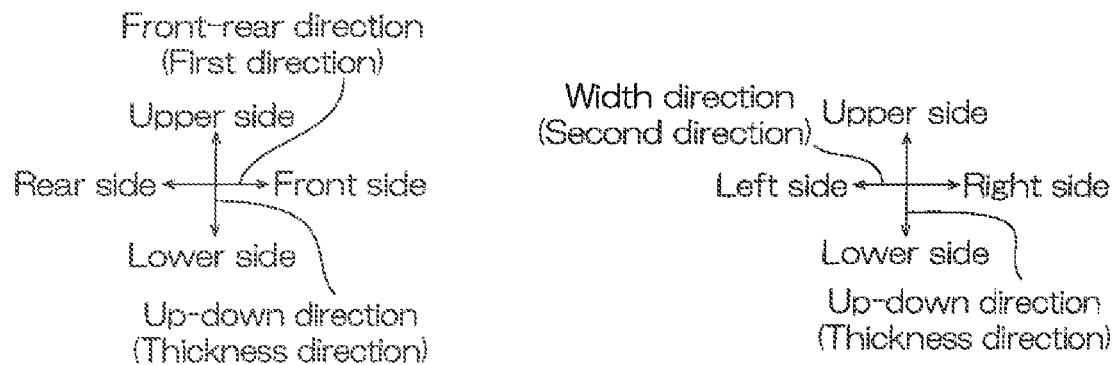
FIG. 11A
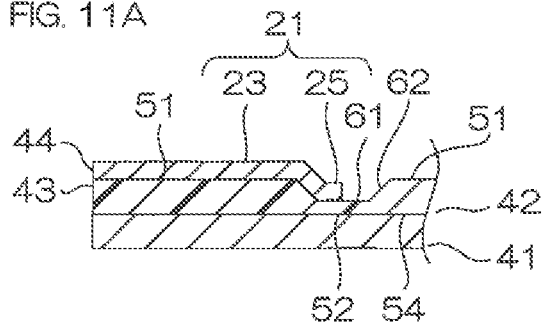 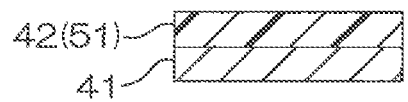
FIG. 11B
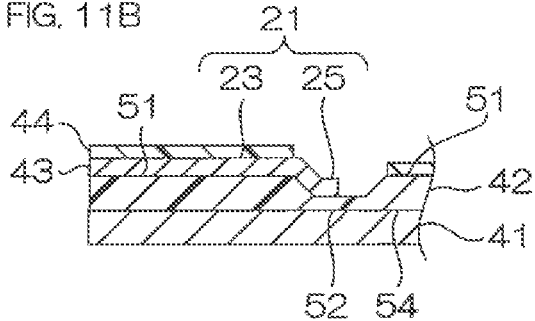 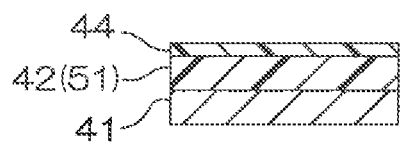
FIG. 11C
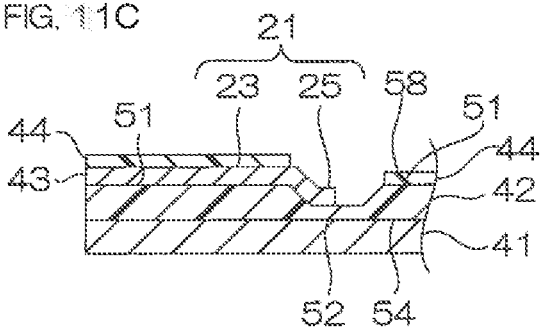 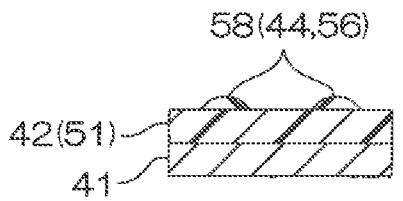

OPTO-ELECTRIC HYBRID BOARD AND OPTO-ELECTRIC HYBRID BOARD ASSEMBLY

CROSS-REFERENCE TO RELATED APPLICATIONS

The present application is a 35 U.S.C. 371 National Stage Entry of PCT/JP2018/013193, filed on Mar. 29, 2018, which claims priority from Japanese Patent Application No. 2017-070902, filed on Mar. 31, 2017, the contents of all of which are herein incorporated by reference in their entirety.

TECHNICAL FIELD

The present invention relates to an opto-electric hybrid board and an opto-electric hybrid board assembly, to be specific, to an opto-electric hybrid board and an opto-electric hybrid board assembly including the opto-electric hybrid board.

BACKGROUND ART

Conventionally, an opto-electric hybrid board has been used by optically and electrically connecting an optical element.

For example, a light transmission device including an optical waveguide that has a mirror surface and extends in one direction, a board that is provided with the optical waveguide, and a light source that emits light toward the mirror surface by inputting electric signals from the board has been proposed (ref: for example, Patent Document 1).

In Patent Document 1, a pad is provided in four corners of a rectangular installation region in which the light source is provided, and each of the pads in the four corners is electrically connected to the light source via a resin core solder ball (electrically conductive member).

In Patent Document 1, a thickness of the resin core solder ball that is provided on the upper surfaces of the pads of the two corners in a one-side end portion (one end portion), and that of the resin core solder ball that is provided on the upper surfaces of the pads of the two corners in the other-side end potion (the other end portion) in the installation region are different, and even when the light source is inclined with respect to a phantom plane along one direction, a proceeding direction of the light emitted from the light source and a normal direction of the mirror surface satisfy a predetermined formula, so that the light transmitting the mirror surface (transmission loss) is reduced.

CITATION LIST

Patent Document

Patent Document 1: Japanese Unexamined Patent Publication No. 2013-195642

SUMMARY OF THE INVENTION

Problem to be Solved by the Invention

However, in accordance with the design of the light transmission device, the pad and the resin core solder ball may be required to be provided only in the one end portion in the installation region without being provided in the other end portion.

However, there is a disadvantage that the light source is more easily and substantially inclined than expected in Patent Document 1 in which the pad and the resin core solder ball are provided on both end portions, and thus, the light emitted from the light source does not reach the mirror surface and as a result, the light source cannot be optically connected to the optical waveguide.

An object of the present invention is to provide an opto-electric hybrid board that is surely capable of receiving light emitted from an optical element having an electrode in one end portion and suppressing a reduction of the optical connecting reliability with the optical element, and an opto-electric hybrid board assembly including the opto-electric hybrid board.

Means for Solving the Problem

The present invention (1) includes an opto-electric hybrid board including an optical waveguide and an electric circuit board sequentially toward one direction in a thickness direction, wherein the opto-electric hybrid board is for optically and electrically connecting an optical element having an electrode at one end portion in a first direction perpendicular to the thickness direction, emitting light from a space between the one end portion and the other end portion in the first direction, and the electric circuit board includes a terminal portion to be electrically connected to the electrode and a support portion that supports the other end portion in the first direction of the optical element; the optical waveguide includes a light receiving portion for receiving light emitted from the optical element; the light receiving portion is positioned between the terminal portion and the support portion, when projected in the thickness direction; and a one-side surface in the thickness direction of the terminal portion is positioned at the other side in the thickness direction with respect to a one-side surface in the thickness direction of the support portion.

In the opto-electric hybrid board, the support portion can support the other end portion in the first direction of the optical element, while the terminal portion is connected to the electrode in the one end portion in the first direction of the optical element.

The one-side surface in the thickness direction of the terminal portion is positioned at the other side in the thickness direction with respect to the one-side surface in the thickness direction of the support portion, so that when an electrically connecting member is provided in the terminal portion, and the terminal portion is electrically connected to the electrode, the relative positioning of the one end portion in the first direction of the optical element at one side in the thickness direction with respect to the other end portion in the first direction can be suppressed.

Thus, the inclination of the optical element can be suppressed.

As a result, the light emitted from the optical element can be surely received by the light receiving portion, and a reduction of the optical connecting reliability of the optical waveguide and the optical element can be suppressed.

The present invention (2) includes the opto-electric hybrid board described in (1), wherein when the opto-electric hybrid board is connected to the optical element, the electric circuit board has a facing surface that faces the optical element in the thickness direction, and the facing surface has a first surface in contact with the optical element and a second surface positioned away from the optical element with respect to the first surface.

In the opto-electric hybrid board, when the opto-electric hybrid board is connected to the optical element, the second surface is positioned away from the optical element with respect to the first surface that is in contact with the optical element, so that a sealing portion that is made by curing a curable resin can be provided between the optical element and the second surface. Thus, when the curable resin contracts in the thickness direction at the time of curing, the optical element and the second surface receive a proximity force, so that the optical element can be brought into tight contact with the first surface. As a result, the optical element can further more surely adhere to the first surface.

The present invention (3) includes the opto-electric hybrid board described in (1) or (2), wherein the electric circuit board includes a base insulating layer, a conductive layer having a terminal, and a cover insulating layer exposing the terminal sequentially toward one direction in the thickness direction; the terminal portion includes the terminal; a part of the base insulating layer is disposed at the other side in the thickness direction of the terminal portion; and a part of the conductive layer and the cover insulating layer is the support portion.

According to the opto-electric hybrid board, a part of the base insulating layer is disposed at the other side in the thickness direction of the terminal portion, and a part of the conductive layer and the cover insulating layer is the support portion that is positioned at one side in the thickness direction of the base insulating layer, so that the one-side surface in the thickness direction of the terminal portion can be further more surely positioned at the other side in the thickness direction with respect to the one-side surface in the thickness direction of the support portion.

The present invention (4) includes the opto-electric hybrid board described in (3), wherein the base insulating layer includes a first base portion facing the terminal portion in the thickness direction and a second base portion facing the support portion in the thickness direction, and the first base portion is thinner than the second base portion.

According to the opto-electric hybrid board, by an easy structure, the one-side surface in the thickness direction of the terminal portion can be easily positioned at the other side in the thickness direction with respect to the one-side surface in the thickness direction of the support portion by the base insulating layer including the first base portion and the second base portion.

The present invention (5) includes an opto-electric hybrid board assembly including the opto-electric hybrid board described in any one of (1) to (4) and an optical element having an electrode at one end portion in a first direction perpendicular to a thickness direction and emitting light from a space between the one end portion and the other end portion in the first direction, wherein the electrode of the optical element is electrically connected to the terminal portion, and the other end portion in the first direction of the optical element is supported by the support portion.

In the opto-electric hybrid board assembly, the electrode of the optical element is electrically connected to the terminal portion, and the other end portion in the first direction of the optical element is supported by the support portion.

The one-side surface in the thickness direction of the terminal portion is positioned at the other side in the thickness direction with respect to the one-side surface in the thickness direction of the support portion, so that when an electrically connecting member is provided in the terminal portion, and the terminal portion is electrically connected to the electrode, the relative positioning of the one end portion in the first direction of the optical element at one side in the thickness direction with respect to the other end portion in the first direction can be suppressed.

Thus, the inclination of the optical element can be suppressed.

As a result, the light emitted from the optical element can be surely received by the light receiving portion, and a reduction of the optical connecting reliability of the optical waveguide and the optical element can be suppressed.

The present invention (6) includes the opto-electric hybrid board assembly described in (5) further including a sealing portion sealing the optical element, wherein the sealing portion is made by curing a curable resin.

The opto-electric hybrid board assembly includes a sealing portion that seals the optical element, so that the durability of the optical element can be improved.

Meanwhile, the sealing portion is made by curing the curable resin, so that in a case where the electric circuit board does not include the support portion, when the curable resin contracts in the thickness direction at the time of curing, the optical element receives a force in which the other end portion in the first direction moves toward the thickness direction. In the opto-electric hybrid board assembly, the electric circuit board includes the support portion, so that the movement of the optical element toward the lower side of the other end portion in the first direction can be controlled by the support portion.

Thus, the inclination of the optical element can be surely suppressed.

Effect of the Invention

According to the opto-electric hybrid board and the opto-electric hybrid board assembly of the present invention, a reduction of the optical connecting reliability of the optical waveguide and the optical element can be suppressed.

BRIEF DESCRIPTION OF THE DRAWINGS

FIGS. 5A to 5E show production process views of the opto-electric hybrid board:

FIG. 5A illustrating a step of preparing a metal support layer,

FIG. 5B illustrating a step of forming a base insulating layer,

FIG. 5C illustrating a step of forming a conductive layer,

FIG. 5D illustrating a step of forming a cover insulating layer,

FIG. 5E illustrating a step of forming a metal protecting layer, and

Figure 3:
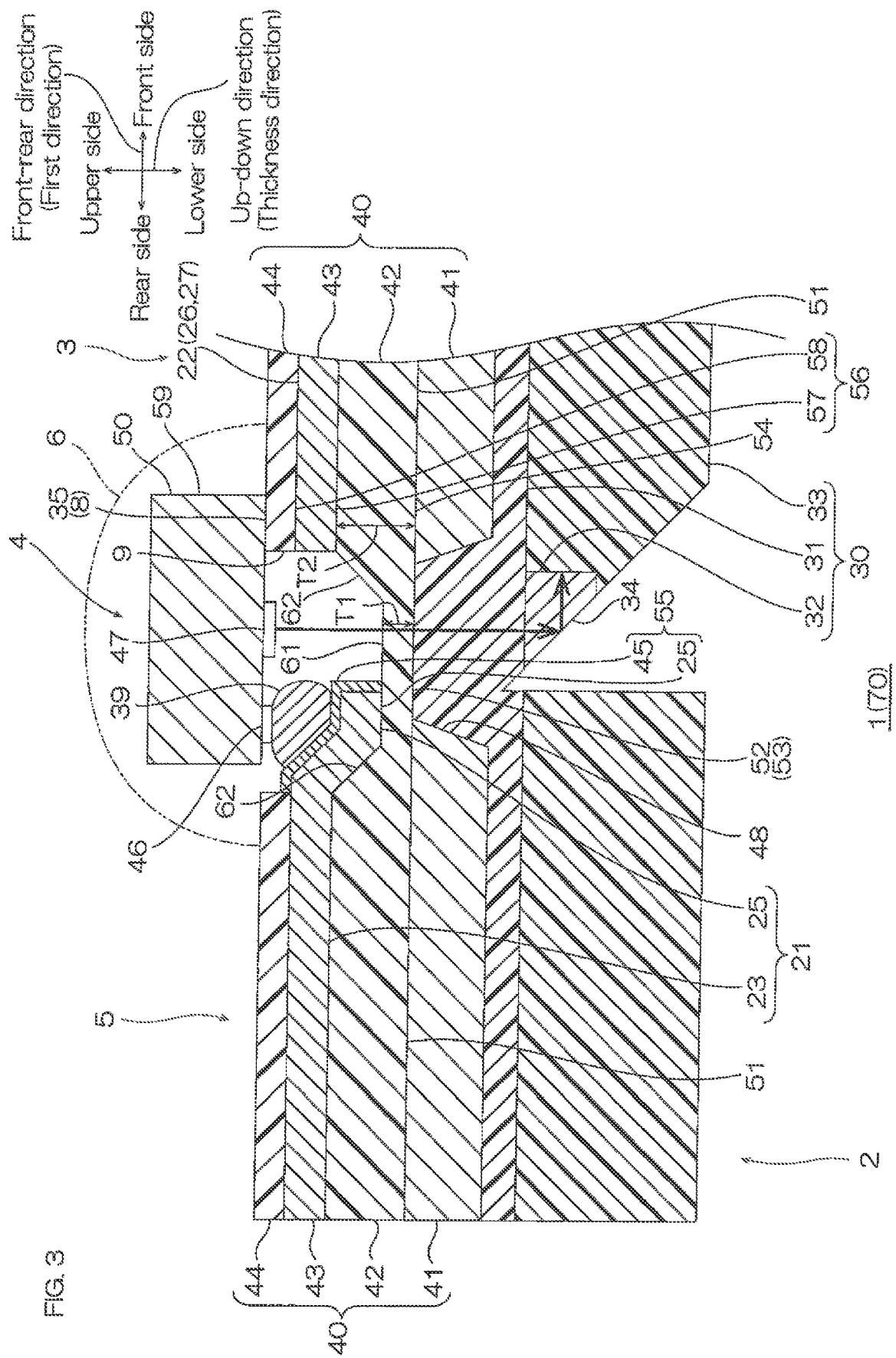
FIG. 3 shows a side cross-sectional view along an A-A line of the opto-electric hybrid board shown in FIG. 1.
Figure 4:
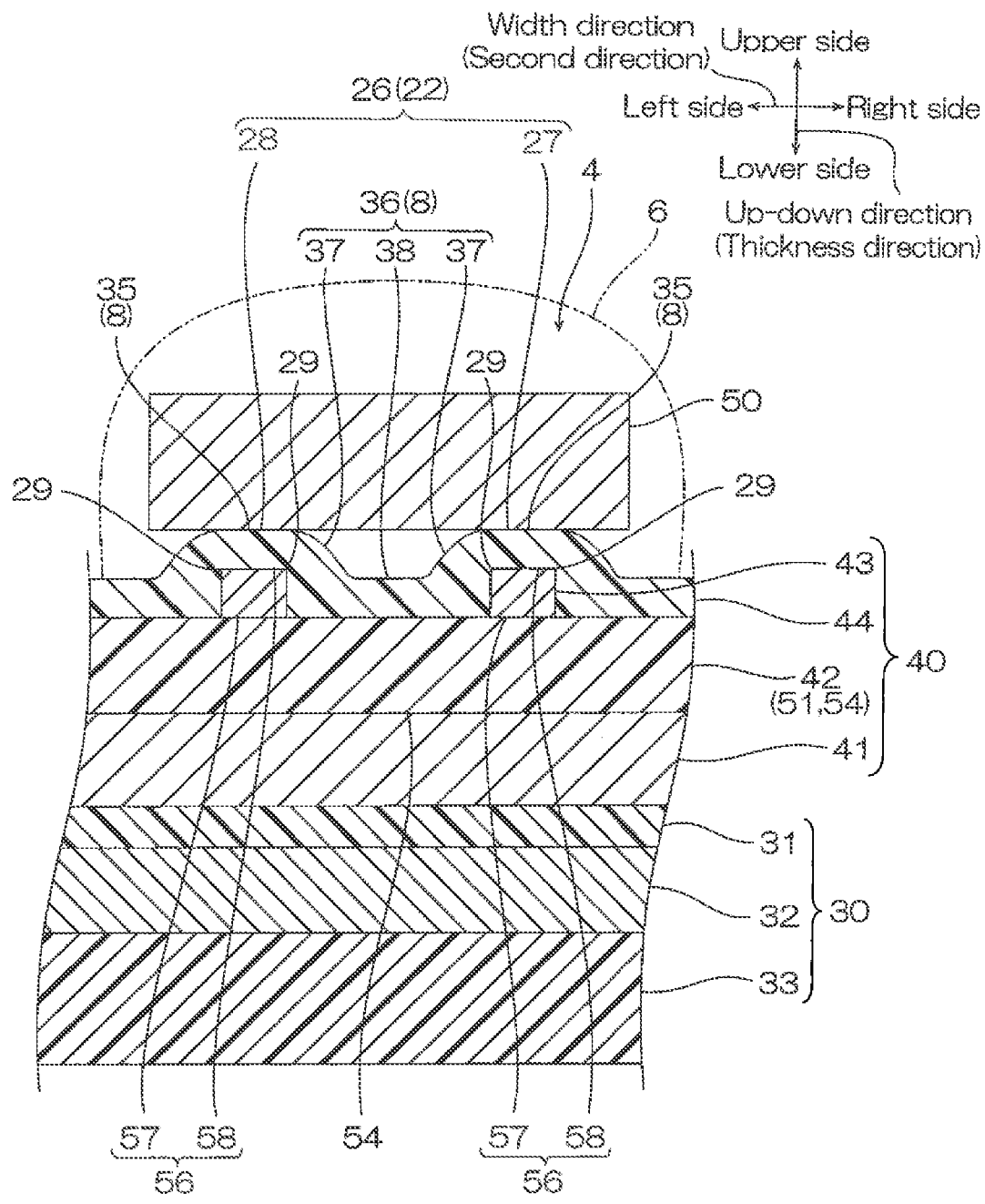
FIG. 4 shows a side cross-sectional view along a B-B line of the opto-electric hybrid board shown in FIG. 1.

The left-side view and the right-side view of each of the figures correspond to FIG. 3 and FIG. 4, respectively.

FIGS. 6F to 6I, subsequent to FIG. 5E, show production process views of the opto-electric hybrid board:

FIG. 6F illustrating a step of forming a support opening portion,

FIG. 6G illustrating a step of forming an under clad layer, a core layer, and an over clad layer, FIG. 6H illustrating a step of forming a mirror surface, FIG. 6I illustrating a step of providing an electrically connecting member, and The left-side view and the right-side view of each of the figures correspond to FIG. 3 and FIG. 4, respectively.

Figure 7:
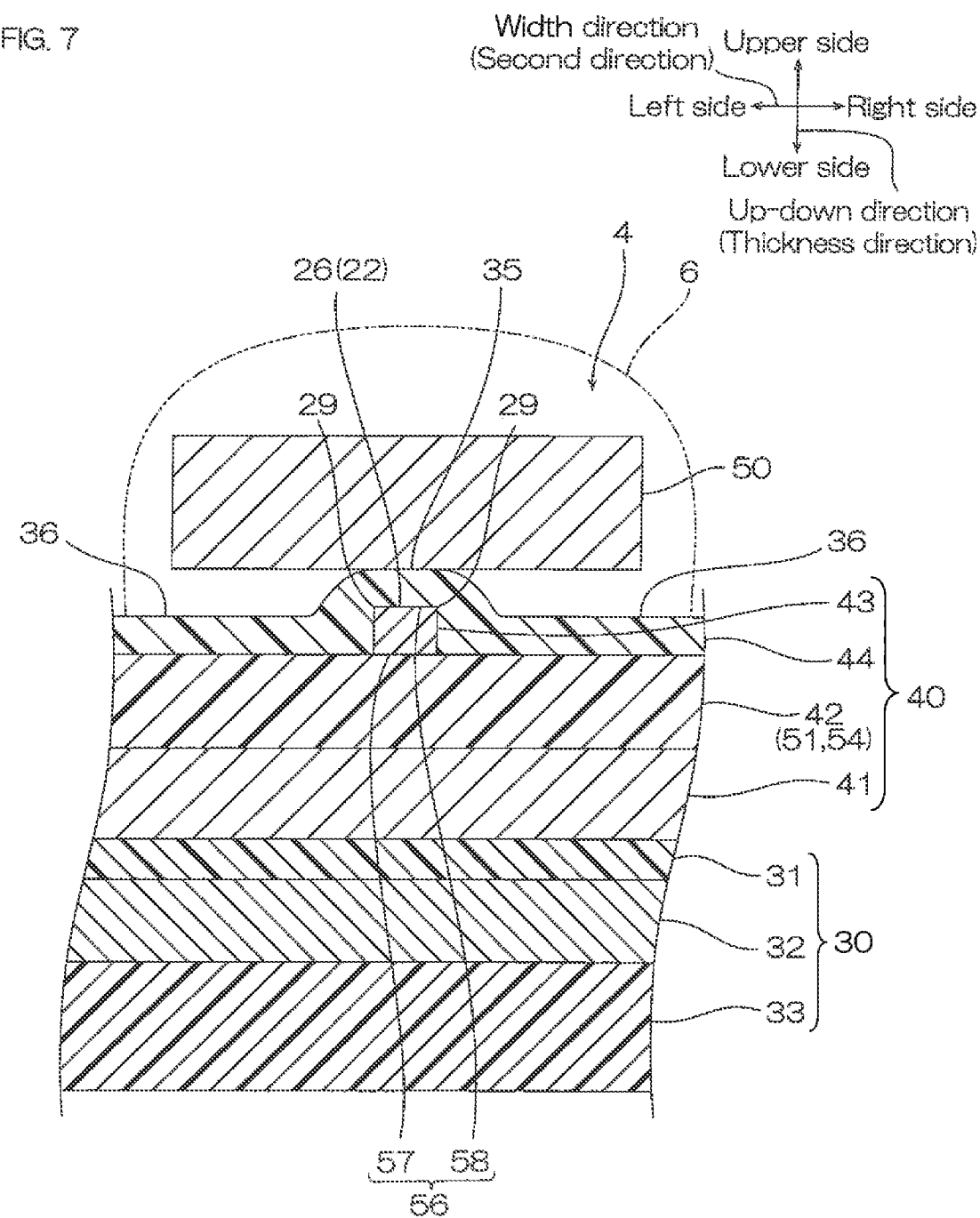

FIG. 7 shows a modified example of the opto-electric hybrid board, and shows a side cross-sectional view corresponding to FIG. 4.

Figure 8:
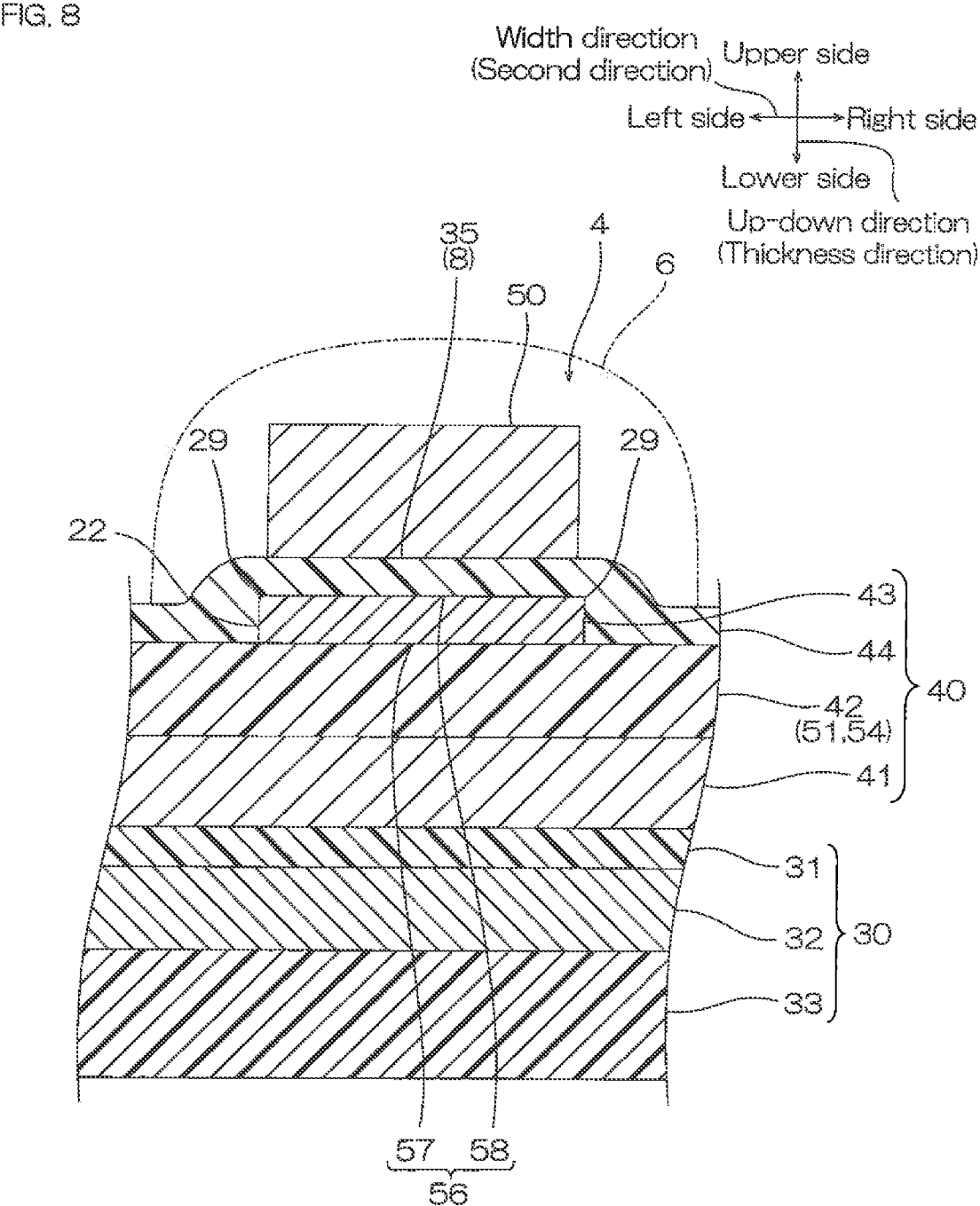

FIG. 8 shows a modified example of the opto-electric hybrid board, and shows a side cross-sectional view corresponding to FIG. 4.

Figure 9:
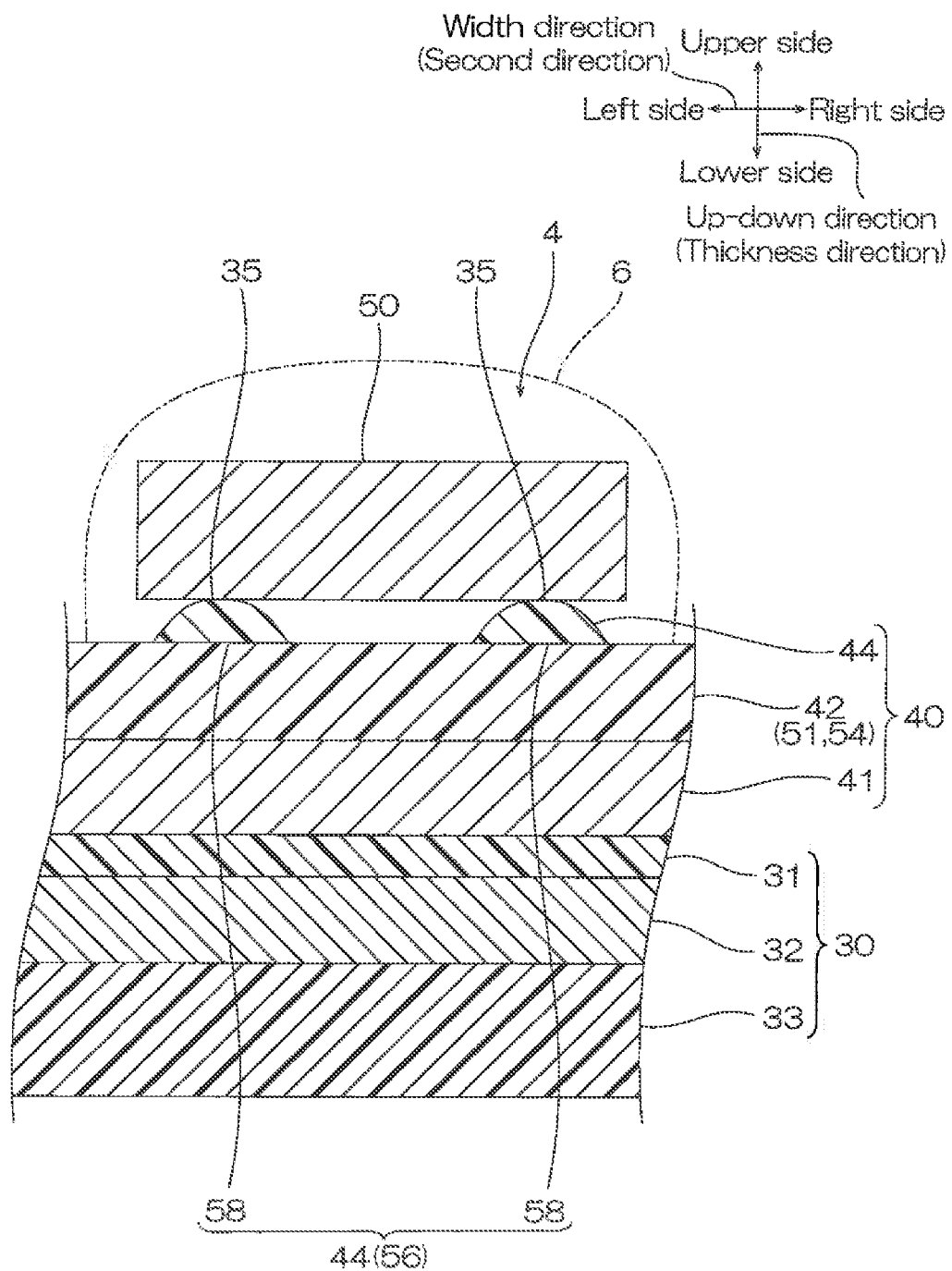

FIG. 9 shows a modified example of the opto-electric hybrid board, and shows a side cross-sectional view corresponding to FIG. 4.

Figure 10:
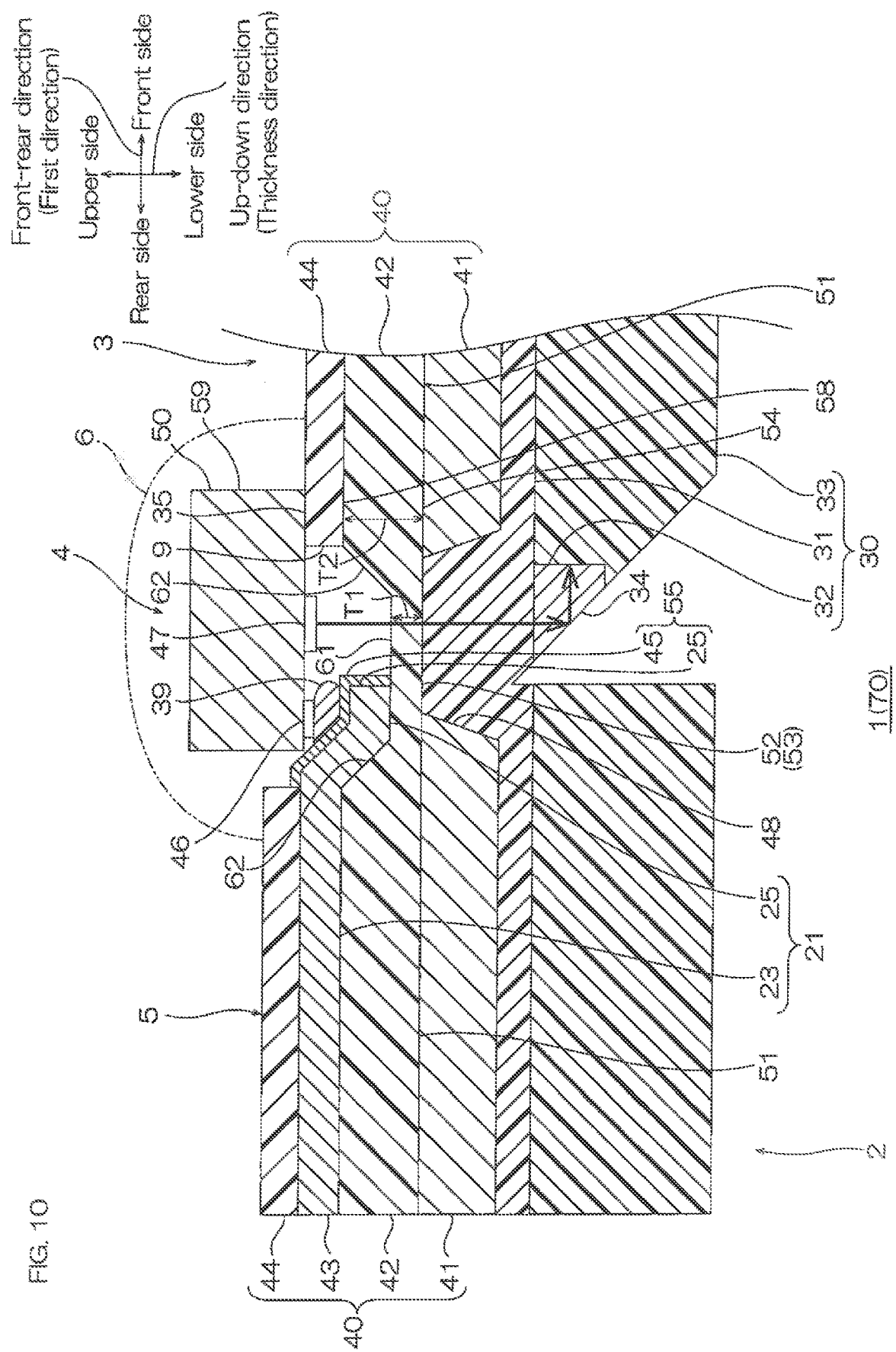

FIG. 10 shows the opto-electric hybrid board shown in FIG. 9, and shows a side cross-sectional view corresponding to FIG. 3.

FIGS. 11A to 11C show process views of forming a cover support portion shown in FIGS. 9 and 10:

FIG. 11A illustrating a step of forming an electric signal pattern,

FIG. 11B illustrating a step of forming a cover insulating layer, and

FIG. 11C illustrating a step of forming a cover support portion.

Figure 12:
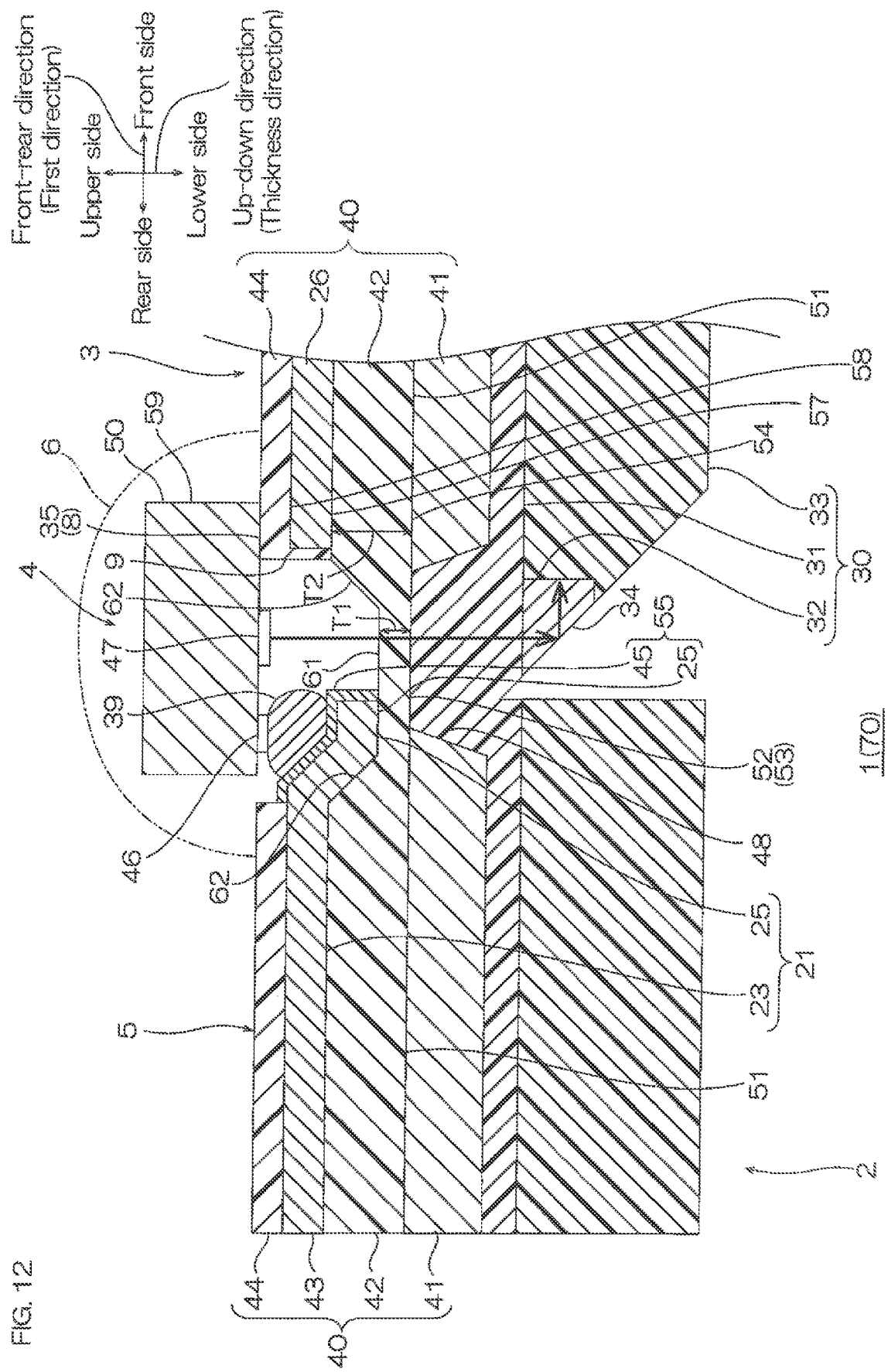

FIG. 12 shows a modified example of the opto-electric hybrid board, and shows a side cross-sectional view corresponding to FIG. 3.

Figure 13:
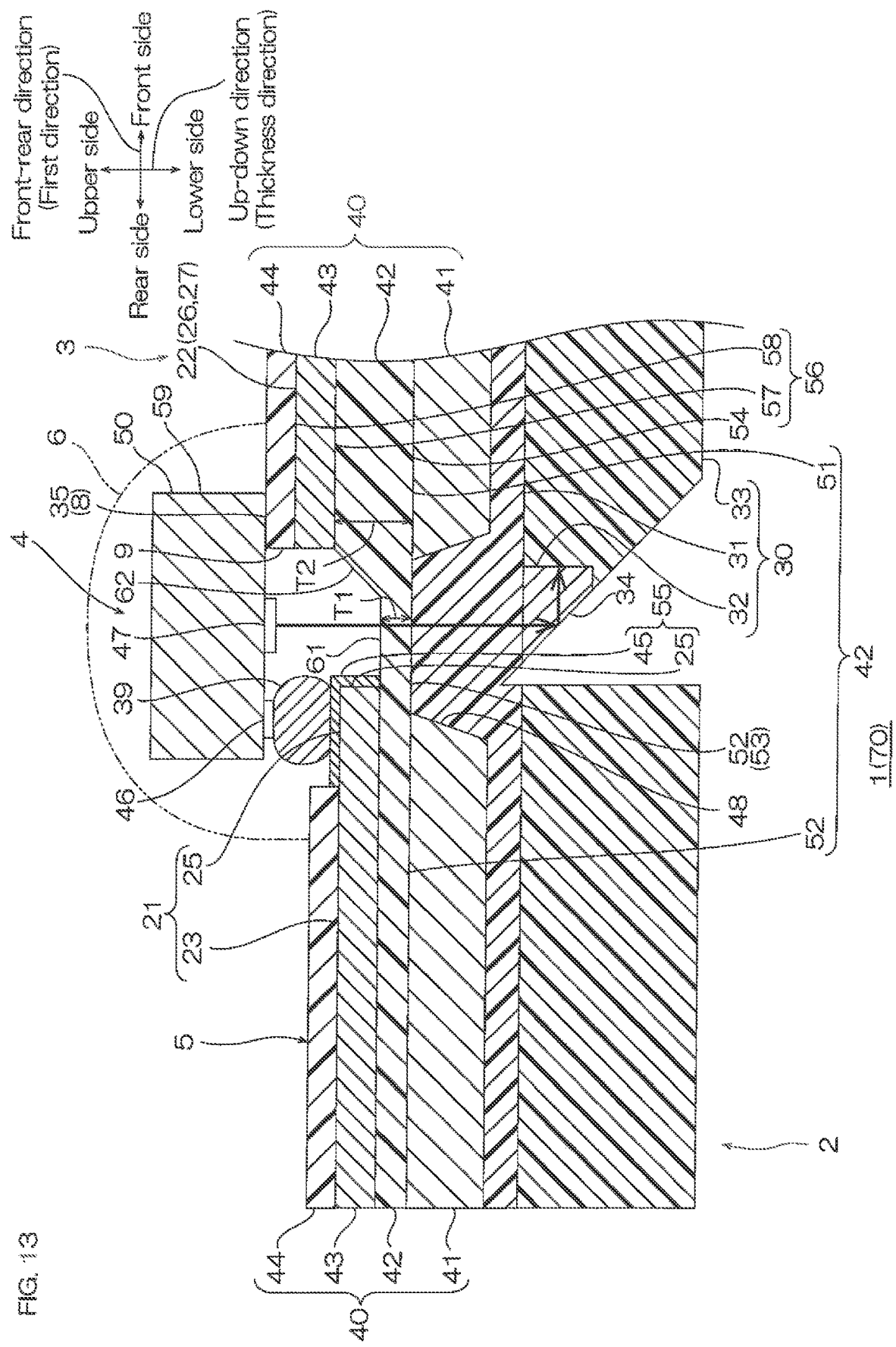

FIG. 13 shows a modified example of the opto-electric hybrid board, and shows a side cross-sectional view corresponding to FIG. 3.

Figure 14:
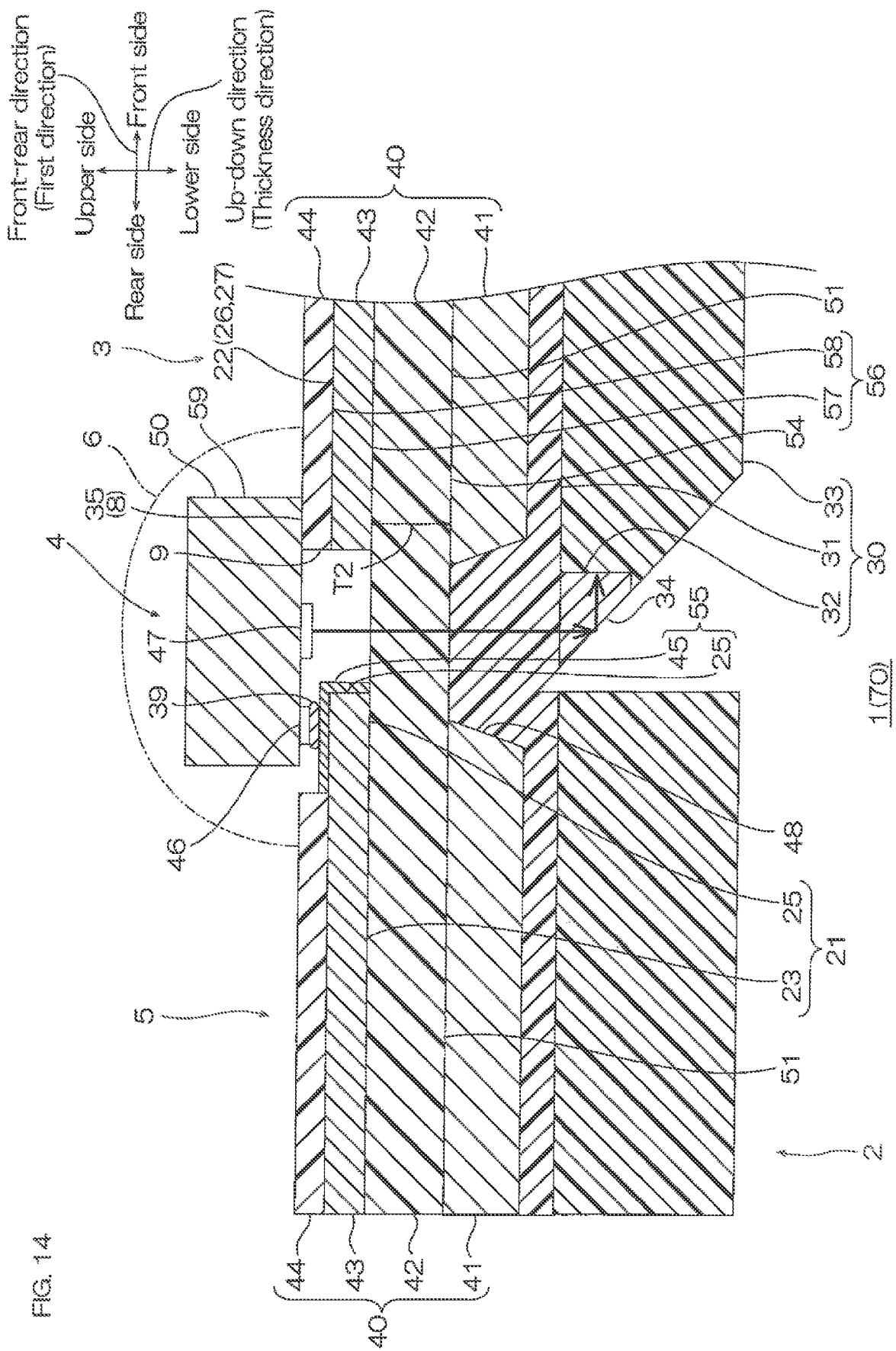

FIG. 14 shows a modified example of the opto-electric hybrid board, and shows a side cross-sectional view corresponding to FIG. 3.

Figure 1:
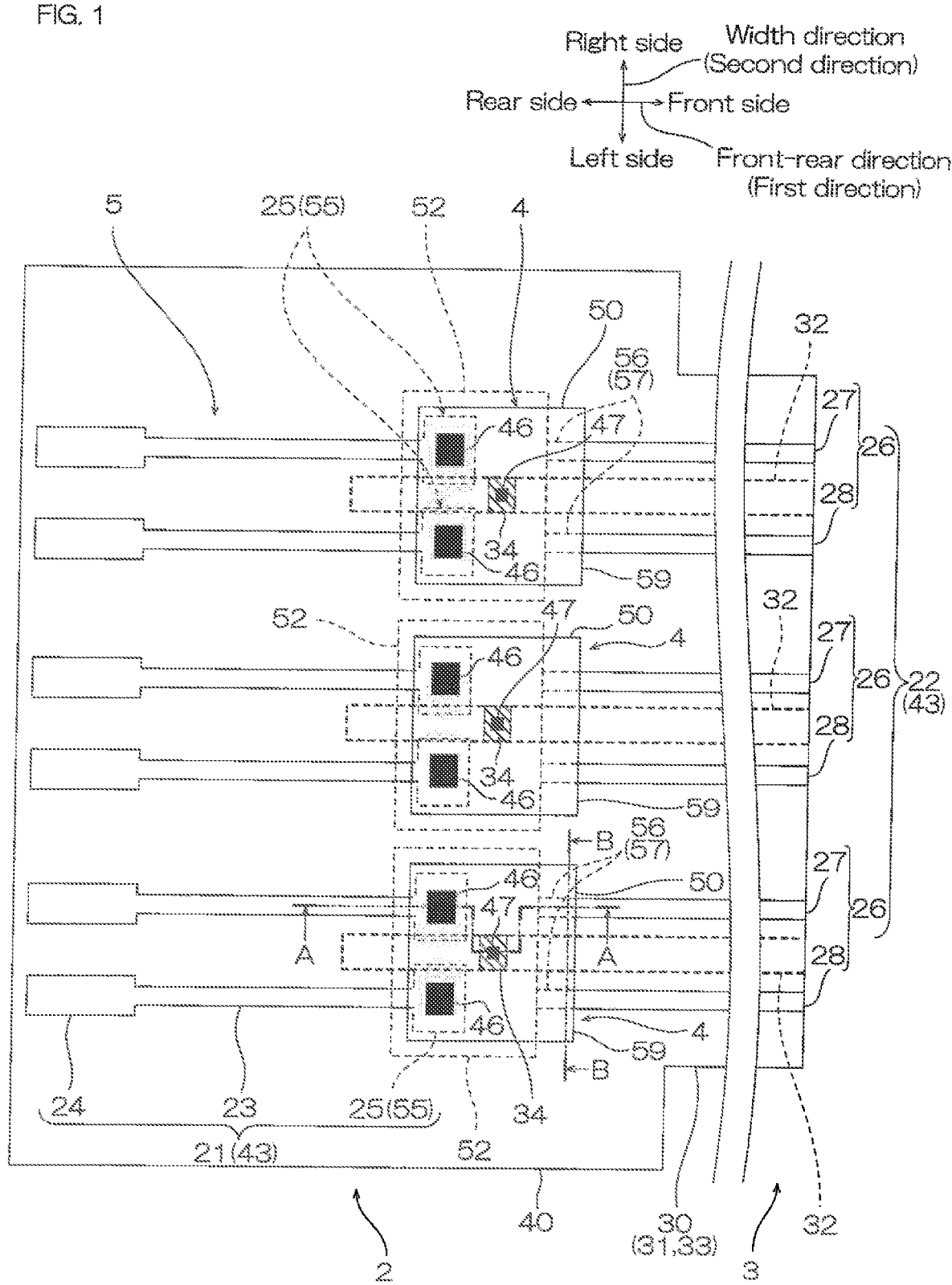
FIG. 1 shows a plan view of one embodiment of an opto-electric hybrid board of the present invention.
Figure 15:
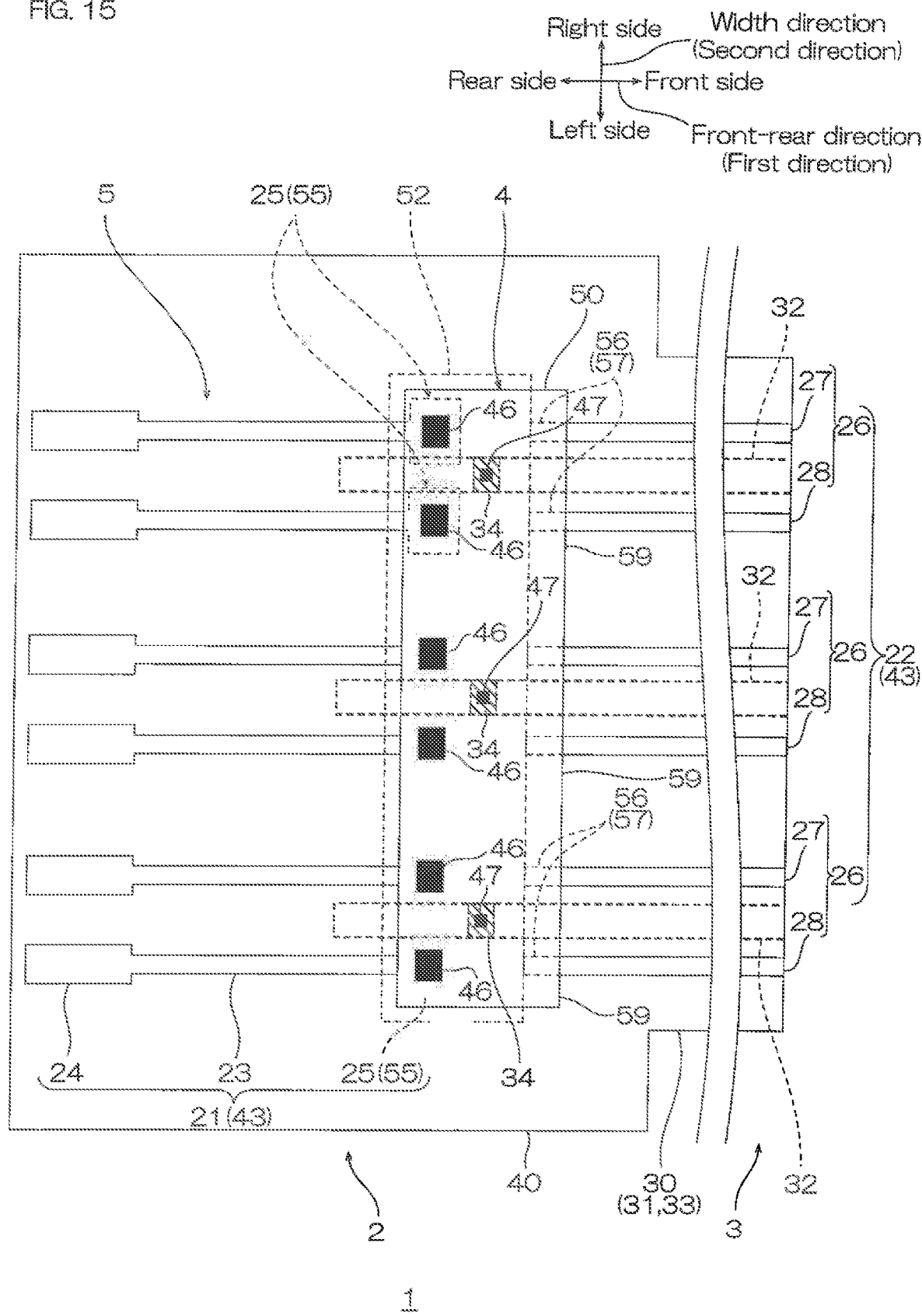

FIG. 15 shows a modified example of the opto-electric hybrid board, and shows a plan view corresponding to FIG. 1.

DESCRIPTION OF EMBODIMENTS

One embodiment of an opto-electric hybrid board of the present invention is described with reference to FIGS. 1 to 4.

Figure 2:
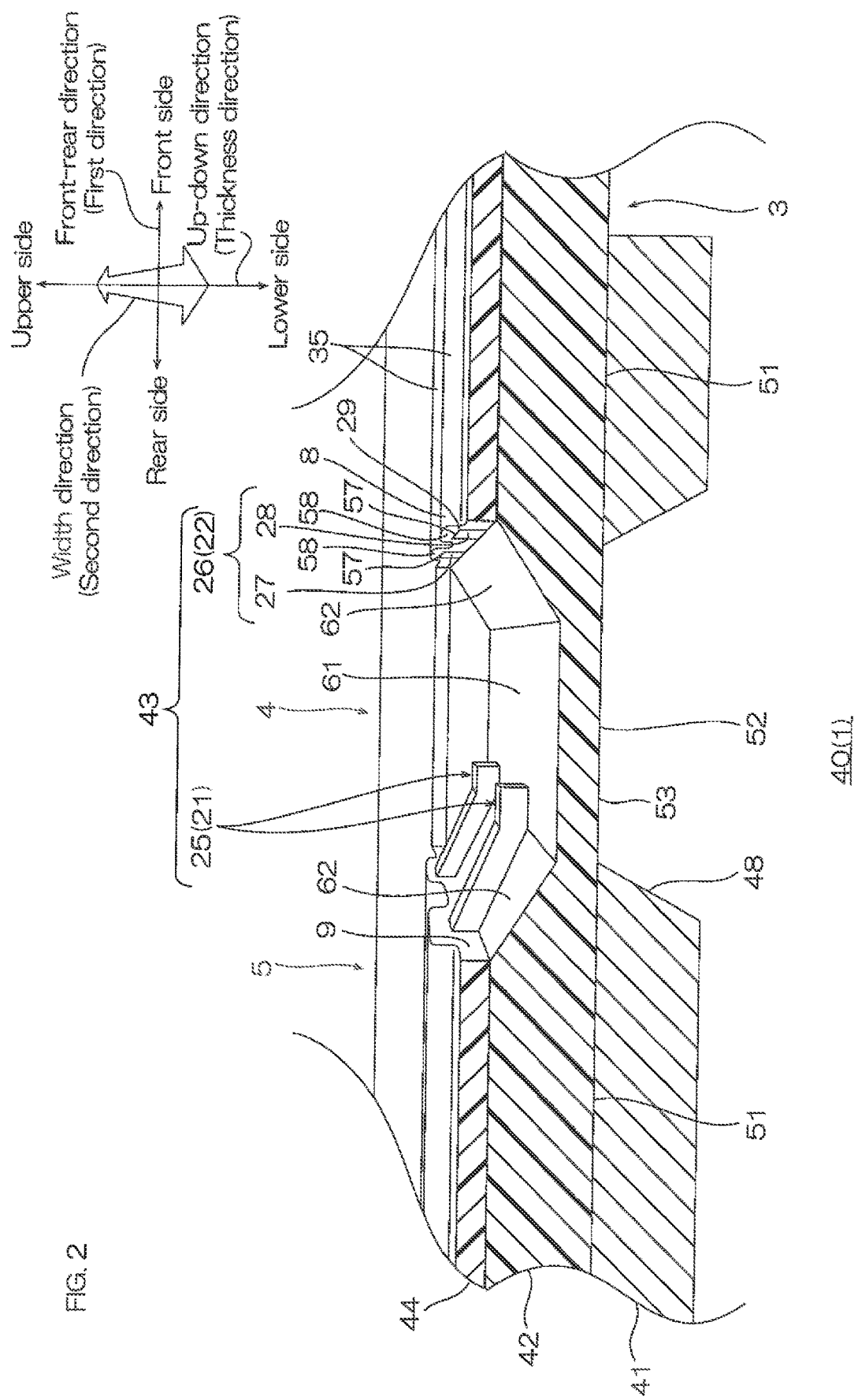
FIG. 2 shows a partially cut front perspective view of an optical element-mounted region of the opto-electric hybrid board shown in FIG. 1.

In FIG. 2, the right-left direction on the plane of the sheet is a front-rear direction (one example of a first direction, a longitudinal direction). The left side on the plane of the sheet is a rear side (one side in the first direction, one side in the longitudinal direction), and the right side on the plane of the sheet is a front side (the other side in the first direction, the other side in the longitudinal direction).

In FIG. 2, the up-down direction on the plane of the sheet is an up-down direction (one example of a thickness direction, a second direction perpendicular to the first direction). The upper side on the plane of the sheet is an upper side (one side in the thickness direction, one side in the second direction), and the lower side on the plane of the sheet is a lower side (the other side in the thickness direction, the other side in the second direction).

In FIG. 2, the far direction is a width direction (one example of a direction perpendicular to the thickness direction, the right-left direction, a third direction perpendicular to the first direction and the second direction). In FIG. 1, the up-down direction on the plane of the sheet is a width direction.

To be specific, directions are in conformity with direction arrows described in each view.

The definition of the directions does not mean to limit the direction of an opto-electric hybrid board 1 and an opto-electric hybrid board assembly 7 at the time of its production and its use.

In FIG. 2, an optical waveguide 30 (described later) and a metal protecting layer 45 (described later) are omitted to clearly show the relative arrangement and the shape of a base insulating layer 42 (described later), a conductive layer 43 (described later), and a cover insulating layer 44 (described later).

As shown in FIG. 1, the opto-electric hybrid board 1 has a generally flat plate shape extending in the front-rear direction. To be specific, the opto-electric hybrid board 1 has a generally T-shape when viewed from the top (the same meaning as "when projected in the thickness direction"). The opto-electric hybrid board 1 continuously includes an optical element-mounted portion 2 and a light transmission portion 3.

The optical element-mounted portion 2 is positioned at the rear side in the opto-electric hybrid board 1. The optical element-mounted portion 2 has a generally rectangular flat plate shape extending in the width direction. The optical element-mounted portion 2 has a plurality of (three) optical element-mounted regions 4 and an electricity transmission region 5 that is continuous thereto.

The plurality of optical element-mounted regions 4 are a region in which optical elements 50 (described later) are mounted. The plurality of optical element-mounted regions 4 are disposed in alignment at spaced intervals to each other in the width direction in the front end portion of the optical element-mounted portion 2. Each of the plurality of optical element-mounted regions 4 has a generally rectangular shape when viewed from the top. Each of the plurality of optical element-mounted regions 4 is provided with the optical element 50 (described later) and a support portion 56 (described later, ref: FIG. 3).

The electricity transmission region 5 is a region that extends from the plurality of optical element-mounted regions 4 rearwardly. The electricity transmission region 5 is provided with a wire 23 and an external terminal 24 (described later).

The light transmission portion 3 is continuously formed at the front side of the optical element-mounted portion 2 in the opto-electric hybrid board 1. To be specific, the light transmission portion 3 has a generally rectangular flat plate (strip) shape extending forwardly from the generally central portion of the front end edge of the optical element-mounted portion 2. The light transmission portion 3 is provided with a plurality of (three) core layers 32 and a conductive support pattern 22 (described later).

As shown in FIG. 3, the light transmission portion 3 sequentially includes the optical waveguide 30 and an electric circuit board 40 upwardly.

The optical waveguide 30 forms the lower layer of the opto-electric hybrid board 1. The optical waveguide 30 has the same outer shape as that of the opto-electric hybrid board 1 when viewed from the top.

The optical waveguide 30 is, for example, strip-type optical waveguide. To be specific, as shown in FIGS. 3 and 4, the optical waveguide 30 sequentially includes an under clad layer 31, the core layer 32, and an over clad layer 33 downwardly. To be more specific, the optical waveguide 30 includes the under clad layer 31, the core layer 32 that is disposed on the lower surface of the under clad layer 31, and the over clad layer 33 that is disposed on the lower surface of the under clad layer 31 so as to cover the under clad layer 31. The optical waveguide 30 preferably consists of only the under clad layer 31, the core layer 32, and the over clad layer 33.

The under clad layer 31 has the same outer shape as that of the optical waveguide 30 when viewed from the top. The under clad layer 31 has a generally sheet (flat plate) shape extending in the front-rear direction. The under clad layer 31 is continuously disposed over the entire region of the light transmission portion 3 and the optical element-mounted region 4 in the optical element-mounted portion 2.

The under clad layer 31 is provided at the lower side of the electric circuit board 40. To be more specific, the under clad layer 31 is disposed on the lower surfaces of a metal support layer 41 and the base insulating layer 42 (described later). A part of the under clad layer 31 fills a support opening portion 48 (described later), and covers the side surfaces of the metal support layer 41.

As a material for the under clad layer 31, for example, a resin having transparency is used, preferably, a resin having insulating properties and transparency is used. To be specific, examples thereof include epoxy resin, polyamic acid resin, polyimide resin, acrylic resin, and norbornene resin. The thickness of the under clad layer 31 is, for example, 2 μm or more, preferably 10 μm or more, and for example, 600 μm or less, preferably 40 μm or less.

The core layer 32 is in contact with the lower surface of the under clad layer 31. As shown by bold dashed lines of FIG. 1, the core layers 32 are disposed at spaced intervals to each other in the width direction. Each of the plurality of (three) core layers 32 has a generally rectangular shape extending in the front-rear direction when viewed in cross section. The plurality of core layers 32 have a pattern included in the under clad layer 31 when viewed from the top. As shown in a hatching portion of FIG. 1, each of the plurality of core layers 32 has a mirror surface 34 as one example of the light receiving portion in the rear end portion thereof.

As shown in FIG. 3, the mirror surface 34 is an inclined surface making an angle of 45 degrees with respect to the lower surface (surface along the plane direction) of the under clad layer 31. The mirror surface 34 is a light transmission direction conversion member (or optical path conversion member) that changes the transmission direction of light (light signal) that enters from the optical element 50 from the up-down direction to the front-rear direction. That is, the mirror surface 34 is a member that receives the light emitted from the optical element 50.

The refractive index of the under clad layer 31 of the core layer 32 is set high with respect to that of the under clad layer 31. A material for the core layer 32 is selected from the material that satisfies the above-described refractive index, to be specific, is selected from the resin having high refractive index, and having excellent insulating properties and transparency, and to be specific, is selected from the resin illustrated in the under clad layer 31. The thickness of the core layer 32 is, for example, 5 μm or more, preferably 30 μm or more, and for example, 100 μm or less, preferably 70 μm or less. The width of the core layer 32 is, for example, 5 μm or more, preferably 50 μm or more, and for example, 200 μm or less, preferably 100 μm or less. The gap between the core layers 32 that are next to each other is, for example, 10 μm or more, preferably 150 μm or more, and for example, 2000 μm or less, preferably 1500 μm or less.

As shown in FIG. 3, the over clad layer 33 covers the core layer 32. To be specific, the over clad layer 33 covers the lower surface and both side surfaces in the width direction of the core layer 32. The over clad layer 33 has the same outer shape as that of the under clad layer 31 when viewed from the top. The over clad layer 33 has a generally sheet (flat plate) shape extending in the front-rear direction.

The refractive index of the over clad layer 33 is set low with respect to that of the core layer 32. Preferably, the refractive index of the over clad layer 33 is the same as that of the under clad layer 31. A material for the over clad layer 33 is selected from the material that satisfies the above-described refractive index, and to be specific, the resin having low refractive index, and having excellent insulating properties and transparency is selected. To be specific, the same resin as that of the under clad layer 31 is selected. The thickness of the over clad layer 33 is, for example, 2 μm or more, preferably 5 μm or more, and for example, 600 μm or less, preferably 40 μm or less.

The electric circuit board 40 is disposed on the optical waveguide 30. The electric circuit board 40 forms the upper layer of the opto-electric hybrid board 1. As shown in FIG. 1, the electric circuit board 40 is continuously disposed over the entire region of the optical element-mounted portion 2 (the optical element-mounted region 4 and the electricity transmission region 5), and the entire region of the light transmission portion 3. Thus, the electric circuit board 40 has the same outer shape as that of the opto-electric hybrid board 1 when viewed from the top.

As shown in FIGS. 2 and 3, the electric circuit board 40 sequentially includes the metal support layer 41, the base insulating layer 42, the conductive layer 43, and the cover insulating layer 44 upwardly. To be specific, the electric circuit board 40 includes the metal support layer 41, the base insulating layer 42 that is disposed on the upper surface of the metal support layer 41, the conductive layer 43 that is disposed on the upper surface of the base insulating layer 42, and the cover insulating layer 44 that is disposed on the upper surface of the base insulating layer 42 so as to cover a part of the conductive layer 43.

As shown in FIG. 3, the electric circuit board 40 further includes the metal protecting layer 45. The electric circuit board 40 preferably consists of only the metal support layer 41, the base insulating layer 42, the conductive layer 43, the cover insulating layer 44, and the metal protecting layer 45.

The metal support layer 41 is a reinforcement layer that supports the conductive layer 43. Although not illustrated in FIG. 1, the metal support layer 41 is provided in the optical element-mounted portion 2 (the optical element-mounted region 4 and the electricity transmission region 5).

As shown in FIGS. 1 to 3, the metal support layer 41 has the plurality of (three) support opening portions 48 corresponding to the plurality of (three) optical element-mounted regions 4. In FIGS. 2 and 3, the only one support opening portion 48 is illustrated. Each of the plurality of support opening portions 48 goes through the metal support layer 41 in the thickness direction. Each of the plurality of support opening portions 48 includes the mirror surface 34 when viewed from the top. A part of the under clad layer 31 fills each of the plurality of support opening portions 48. Thus, in the support opening portion 48, the lower surface of the base insulating layer 42 is in direct contact with the upper surface of the under clad layer 31.

Examples of a material for the metal support layer 41 include metals such as stainless steel, 42-alloy, aluminum, copper-beryllium, phosphor bronze, copper, silver, aluminum, nickel, chromium, titanium, tantalum, platinum, and gold. The thickness of the metal support layer 41 is, for example, 3 μm or more, preferably 10 μm or more, and for example, 100 μm or less, preferably 50 μm or less.

The base insulating layer 42, along with the metal support layer 41, is a support layer (base support layer) that supports the conductive layer 43. The base insulating layer 42 is an insulating layer that insulates the conductive layer 43 from the metal support layer 41.

Although not illustrated in FIG. 1, the base insulating layer 42 is provided in both the optical element-mounted portion 2 and the light transmission portion 3. The base insulating layer 42 has the same outer shape as that of the electric circuit board 40 when viewed from the top. The base insulating layer 42 has a generally flat plate shape.

As shown in FIGS. 2 and 3, the base insulating layer 42 continuously has a thick portion 51 and a thin portion 52 (region surrounded by thin dashed lines of FIG. 1) that is thinner than the thick portion 51.

As shown by the thin dashed lines of FIG. 1, the thin portion 52 is provided corresponding to each of the plurality of (three) optical element-mounted regions 4. Each of the plurality of (three) thin portions 52 is a region having a generally rectangular shape when viewed from the top.

As shown in FIGS. 2 and 3, the lower surface of the thin portion 52 forms the same flat surface that is common to the lower surface of the thick portion 51. Meanwhile, the upper surface of the thin portion 52 is positioned at the lower side with respect to the upper surface of the thick portion 51.

As shown in FIG. 1, each of the plurality of thin portions 52 is partially overlapped with each of the plurality of optical element-mounted regions 4. To be specific, the thin portion 52 is positioned slightly off toward the rear side with respect to the optical element-mounted region 4.

To be more specific, the front end edge of the thin portion 52 is positioned between the front end edge and the central portion in the front-rear direction of the optical element-mounted region 4. That is, the front end edge of the thin portion 52 is disposed at the immediately rear side of the front end edge of the optical element-mounted region 4.

The rear end edge of the thin portion 52 is positioned at the rear side of the rear end edge of the optical element-mounted region 4 at spaced intervals thereto. To be specific, the rear end edge of the thin portion 52 is disposed at the immediately rear side of the rear end edge of the optical element-mounted region 4.

As shown in FIGS. 2 and 3, the upper surface of the thin portion 52 integrally has a flat surface portion 61 that is parallel in the plane direction in the central portion thereof, and an inclined surface portion 62 that is disposed at the periphery of the flat surface portion 61 and gradually proceeds upwardly (is inclined) toward the outer side. The central portion of the flat surface portion 61 is overlapped with the mirror surface 34 when viewed from the top.

The thick portion 51 expands outwardly in the plane direction (the front-rear direction and the width direction) from the peripheral end edge of the thin portion 52.

As a material for the base insulating layer 42, for example, a resin having insulating properties is used, preferably, a resin having insulating properties and flexibility is used. Examples of a material for the base insulating layer 42 include resins such as polyimide resin, polyether nitrile resin, polyether sulfone resin, polyethylene terephthalate resin, polyethylene naphthalate resin, and polyvinyl chloride resin. Preferably, polyimide is used.

A thickness T1 of the thick portion 51 is, for example, 2 µm or more, preferably 5 µm or more, and for example, 50 µm or less, preferably 15 µm or less.

A thickness T2 of the thin portion 52 is, for example, 18 µm or less, preferably 10 µm or less, and for example, 1 µm or more, preferably 3 µm or more.

A difference (T1−T2) in the thickness between the thick portion 51 and the thin portion 52 with respect to 100% of the thickness T1 of the thick portion 51 is, for example, 95% or less, preferably 90% or less, and for example, 10% or more, preferably 50% or more.

The size of the thin portion 52 when viewed from the top is appropriately set in accordance with the size of the optical element 50 or the like when viewed from the top.

As shown in FIGS. 1 and 3, the conductive layer 43 includes an electric signal pattern 21 that transmits electricity (electric signals) between an external circuit board (not shown) and the optical element 50, and the conductive support pattern 22 that supports the optical element 50 without transmitting the electricity (electric signals).

The electric signal pattern 21 is a rear-side pattern that is positioned in the rear portion of the conductive layer 43. The electric signal pattern 21 is positioned over the rear end portion of the optical element-mounted region 4 and the electricity transmission region 5. The electric signal pattern 21 continuously includes the plurality of wires 23, the plurality of external terminals 24, and element-side terminals 25 as one example of the plurality of terminals.

The plurality of wires 23 are disposed in alignment at spaced intervals to each other in the width direction. Each of the plurality of wires 23 has a strip shape extending along the front-rear direction. The wires 23 are disposed on the thick portion 51 of the base insulating layer 42 in a portion except for the rear end portion in the electricity transmission region 5.

Each of the plurality of external terminals 24 is continuous to each of the rear end portions of the plurality of wires 23. The plurality of external terminals 24 are disposed in alignment at spaced intervals to each other in the width direction. Each of the plurality of external terminals 24 has a generally rectangular shape (square land shape) when viewed from the top. Although not illustrated in FIG. 3, the plurality of external terminals 24 are provided on the thick portion 51 in the rear end portion of the electricity transmission region 5.

Each of the plurality of element-side terminals 25 is continuous to each of the front end portions of the plurality of wires 23. The plurality of element-side terminals 25 are disposed in alignment at spaced intervals to each other in the width direction. Each of the plurality of element-side terminals 25 has a generally rectangular shape (square land shape) when viewed from the top. As shown in FIGS. 2 and 3, the plurality of element-side terminals 25 are provided on the thin portion 52 of the base insulating layer 42 in the rear end portion of the optical element-mounted region 4. To be specific, each of the plurality of element-side terminals 25 is disposed on the flat surface portion 61 and the inclined surface portion 62 in the rear end portion of the thin portion 52. That is, the rear-side portion of the element-side terminal 25 is provided on the inclined surface portion 62, while the front-side portion of the element-side terminal 25 is provided on the rear end portion of the flat surface portion 61. Thus, the element-side terminal 25 has a generally cross-sectional shape that bends in the central portion in the front-rear direction. The element-side terminal 25 is not provided in the central portion in the front-rear direction and the front end portion of the flat surface portion 61, and exposes those.

The thin portion 52 facing the lower side of the element-side terminal 25 corresponds to a first base portion 53.

As shown in FIGS. 1 and 2, the two (one pair of) wires 23, the two (one pair of) external terminals 24, and the two (one pair of) element-side terminals 25 are provided with respect to the one optical element-mounted region 4. Among all, in the electric circuit board 40, the three pairs of element-side terminals 25 corresponding to the three optical element-mounted regions 4 are provided. The two element-side terminals 25 corresponding to the one optical element-mounted region 4 are disposed so as to face each other at spaced intervals in the width direction. To be specific, the two element-side terminals 25 are overlapped each other, when projected in the width direction.

As shown in FIGS. 1 and 3, the conductive support pattern 22 is a front-side pattern that is positioned in the front portion of the conductive layer 43. The conductive support pattern 22 is disposed at the front side of the electric signal pattern 21 at spaced intervals thereto. That is, the conductive support pattern 22 is provided independently from the electric signal pattern 21. The conductive support pattern 22 is insulated from the electric signal pattern 21.

The conductive support pattern 22 includes a plurality of (six) conductive lines 26 that are provided corresponding to the plurality of wires 23. The plurality of conductive lines 26 are disposed in alignment at spaced intervals to each other in the width direction. Each of the plurality of conductive lines 26 has a strip shape extending along the front-rear direction. The plurality of conductive lines 26 are provided on the front end portion of the optical element-mounted region 4, and on the thick portion 51 of the base insulating layer 42 in the light transmission portion 3.

The plurality of conductive lines 26 are overlapped with the plurality of wires 23, when projected in the front-rear direction. In short, the plurality of conductive lines 26 are disposed on an extended line that extends the plurality of wires 23 forwardly. For example, the plurality of conductive lines 26 are disposed with the same width and the same interval (the same interval in the width direction) as those of the plurality of wires 23.

Of the conductive support patterns 22, a portion that is positioned in the optical element-mounted region 4 corresponds to a conductive support portion 57 that is one example of a part of the conductive layer 4.

As shown in FIG. 1, the two (one pair of) conductive lines 26 are provided with respect to the one optical element-mounted region 4. The two (one pair of) conductive lines 26 corresponding to the one optical element-mounted region 4 are disposed so as to have a uniform interval in the width direction thereof along the front-rear direction, and to be specific, are parallel to each other when viewed from the top. The two conductive lines 26 corresponding to the one optical element-mounted region 4 are a first line 27 that is positioned at one side in the width direction and a second line 28 that is positioned at spaced intervals to the first line 27 at the other side in the width direction.

As shown in FIG. 2, each of the rear end surfaces of the first line 27 and the second line 28 is flush with the rear end surface of the cover insulating layer 44 that covers both side surfaces and the upper surface in the width direction thereof in the thickness direction and the width direction. The rear end surfaces of the first line 27 and the second line 28 are continuous to the rear end surface of the above-described cover insulating layer 44. Both of the rear end surface of the first line 27 and that of the second line 28 are exposed from the cover insulating layer 44.

Furthermore, as shown in FIG. 4, each of the first line 27 and the second line 28 has a generally rectangular shape when viewed in cross section. Thus, each of the first line 27 and the second line 28 has two ridgelines 29 where the upper surface and the side surface cross each other.

Examples of a material for the conductive layer 43 include conductors such as copper, nickel, gold, and solder. Preferably, copper is used.

The thickness of the conductive layer 43 is, for example, 2 μcm or more, preferably 5 μm or more, and for example, 20 μm or less, preferably 15 μm or less.

As shown in FIGS. 3 and 4, the cover insulating layer 44 is provided in both of the optical element-mounted portion 2 and the light transmission portion 3. The cover insulating layer 44 is provided on the thick portion 51 of the base insulating layer 42, and is not provided on the thin portion 52 (to be more specific, the flat surface portion 61) (has a pattern exposing the thin portion 52). The cover insulating layer 44 has the same outer shape as that of the base insulating layer 42 when viewed from the top.

The cover insulating layer 44 is a protective insulating layer that covers the wire 23 and the conductive line 26. Meanwhile, the cover insulating layer 44 exposes the external terminal 24 and the element-side terminal 25.

The cover insulating layer 44 has a cover opening portion 9 that exposes the thin portion 52.

The cover insulating layer 44 has a cross-sectional shape that conforms to the upper surface of the base insulating layer 42, the wire 23, and the upper surface of the conductive line 26. Of the cover insulating layer 44 that is positioned on the conductive line 26, a portion that is positioned in the optical element-mounted region 4 corresponds to a cover support portion 58 as one example of a part of the cover insulating layer 44. The cover support portion 58, along with the conductive support pattern 22, supports the optical element 50.

To be specific, the cover support portion 58 is a portion that is positioned on the conductive support pattern 22 in the optical element-mounted region 4. To be more specific, the cover insulating layer 44 covers both each of the upper surfaces and the both side surfaces in the width direction of the two conductive lines 26 (the first line 27 and the second line 28), and the upper surface of the base insulating layer 42 that does not face the conductive line 26 in the thickness direction (is displaced when viewed from the top).

The upper surface of the cover insulating layer 44 in the optical element-mounted region 4 is an element-facing surface 8 as one example of a facing surface that faces the optical element 50 in the thickness direction, when the optical element 50 is mounted. The element-facing surface 8 continuously has two first surfaces 35 that correspond to the upper surfaces of the two conductive lines 26, and a second surface 36 that corresponds to the upper surface of the base insulating layer 42 between the two conductive lines 26.

The two first surfaces 35 are disposed at spaced intervals to each other in the width direction. The two first surfaces 35 are positioned at the same position in the thickness direction. The first surface 35 is the upper surface of the cover support portion 58.

The second surface 36 is positioned in a position that is away from the lower side of the first surface 35. That is, the second surface 36 is positioned at the lower side from the first surface 35. The second surface 36 is positioned between the two first surfaces 35 when viewed from the top. To be specific, the second surface 36 connects the two first surfaces 35. The second surface 36 continuously has two curved surfaces 37 that curve from each of the inner end portions in the width direction of the two first surfaces 35 corresponding to the ridgeline 29, and a flat surface 38 that connects the inner end portions in the width direction of the two curved surfaces 37. The flat surface 38 is parallel with the upper surface of the base insulating layer 42.

Meanwhile, the cover support portion 58, along with the conductive support portion 57, constitutes a support portion 56.

The support portion 56 is a pedestal for supporting the lower surface of the rear end portion of the optical element 50. To be specific, the support portion 56 includes the conductive support portion 57 and the cover support portion 58. The support portion 56 preferably consists of only the conductive support portion 57 and the cover support portion 58. The upper surface (the first surface 35) of the support portion 56 is a pedestal surface with which the front end portion of the optical element 50 is in direct contact.

The mirror surface 34 is positioned between the support portion 56 and the optical element 50, when projected in the thickness direction. To be more specific, between the support portion 56 and the optical element 50, the mirror surface 34 is positioned in the projected surface that is obtained when the support portion 56 and the optical element 50 are projected in both of the thickness direction and the width direction.

On the other hand, in the base insulating layer 42, a portion that faces the lower side of the support portion 56 is included in the thick portion 51, and the portion is defined as a second base portion 54.

As a material for the cover insulating layer 44, a resin that is illustrated in the base insulating layer 42 is used.

The thickness of the cover insulating layer 44 is, for example, 2 µm or more, preferably 4 µm or more, and for example, 20 µm or less, preferably 10 pun or less. The thickness of the cover insulating layer 44 is a length from the upper surface of the base insulating layer 42 to the upper surface of the cover insulating layer 44 in a region that is not overlapped with the conductive layer 43, and a length from the upper surface of the conductive layer 43 to the upper surface of the cover insulating layer 44 in a region that is overlapped with the conductive layer 43. Among all, the thickness of the cover support portion 58 is a length from the upper surface of the conductive support portion 57 to the first surface 35.

The metal protecting layer 45 is provided on the surfaces of the external terminal 24 (ref: FIG. 1, not illustrated in FIG. 3) and the element-side terminal 25. Among all, the metal protecting layer 45 continuously covers the upper surface, both side surfaces in the right-left direction, and the front surface of the element-side terminal 25.

The metal protecting layer 45 is, for example, a plating layer. As a material for the metal protecting layer 45, for example, a plating material such as gold is used.

The element-side terminal 25 and the metal protecting layer 45 that corresponds thereto constitute a terminal portion 55. That is, the terminal portion 55 includes the metal protecting layer 45 and the element-side terminal 25. Preferably, the terminal portion 55 consists of only the metal protecting layer 45 and the element-side terminal 25.

The upper surface of the terminal portion 55 is the upper surface of the metal protecting layer 45, and is positioned at the lower side with respect to the upper surface of the support portion 56. To be specific, the upper surface of the terminal portion 55 is positioned at the lower side with respect to the upper surface of the support portion 56 by, for example, 1 µm or more, preferably 10 µm or more.

Next, a method for producing the opto-electric hybrid board 1 is described with reference to FIGS. 5A to 6I.

In the method for producing the opto-electric hybrid board 1, a first step of producing the electric circuit board 40 and a second step of producing the optical waveguide 30 are sequentially performed.

In the first step, as shown in FIG. 5A, first, the metal support layer 41 is prepared. The metal support layer 41 is prepared in a flat plate shape (to be specific, as a metal plate that does not have the support opening portion 48 (ref: FIG. 6F)).

As shown in FIG. 5B, next, the base insulating layer 42 is provided on the metal support layer 41 so as to have the thick portion 51 and the thin portion 52.

For example, a photosensitive resin composition containing a resin is applied onto the metal support layer 41, and thereafter, the base insulating layer 42 having the thick portion 51 and the thin portion 52 is formed by a photolithography method including a gradation exposure to light method to be then heated (cured) as needed.

Or, the base insulating layer 42 having the thick portion 51 without having the thin portion 52 is formed by a photolithography method without including a gradation exposure to light method, and next, the thin portion 52 can be also formed by etching, laser processing, or the like. Or, two (two layers) of a first layer corresponding to the thin portion 52 and a second layer corresponding to the thick portion 51 are sequentially laminated, so that the base insulating layer 42 can be also formed.

As shown in FIG. 5C, next, the conductive layer 43 is formed on the base insulating layer 42. To be specific, the conductive layer 43 is formed in a pattern having the electric signal pattern 21 and the conductive support pattern 22 (including the conductive support portion 57) by an additive method or a subtractive method, preferably, an additive method. At this time, the element-side terminal 25 is provided by conforming to the inclined surface of the rear end edge of the thin portion 52, and the flat surface continuous to the front side thereof.

As shown in FIG. 5D, next, the cover insulating layer 44 (including the cover support portion 58) is formed on the thick portion 51 of the base insulating layer 42 so as to expose the external terminal 24 (ref: FIG. 1), the element-side terminal 25, and the thin portion 52 and to cover the wire 23 and the conductive support pattern 22.

To be specific, the above-described photosensitive resin composition containing the resin is applied onto the base insulating layer 42 and the conductive layer 43, and thereafter, the cover insulating layer 44 is formed by a photolithography method to be then heated (cured) as needed.

In this manner, the support portion 56 including the conductive support portion 57 and the cover support portion 58 is formed.

Next, as shown in FIG. 5E, the metal protecting layer 45 is provided on the surfaces of the external terminal 24 (ref: FIG. 1) and the element-side terminal 25.

For example, the metal protecting layer 45 is provided by electrolytic plating or the like. In this manner, the optical element 50 including the element-side terminal 25 and the metal protecting layer 45 is formed.

As shown in FIG. 6F, thereafter, the metal support layer 41 is, for example, trimmed by etching or the like, so that the support opening portion 48 is formed.

The electric circuit board 40 is obtained by the first step.

Next, the second step of producing the optical waveguide 30 is performed.

As shown in FIGS. 6G and 6H, in the second step, the optical waveguide 30 is fabricated below the opto-electric hybrid board 1. To be more specific, the optical waveguide 30 is produced below the base insulating layer 42 and the metal support layer 41.

As referred to FIG. 6G, to be specific, the above-described photosensitive resin composition containing the resin is applied to the lower side of the base insulating layer 42 and the metal support layer 41, and thereafter, the under clad layer 31 is formed by the photolithography method.

Subsequently, the above-described photosensitive resin composition containing the resin is applied to the lower side of the under clad layer 31 and thereafter, the core layer 32 is formed by the photolithography method.

Thereafter, as shown in FIG. 6G the above-described photosensitive resin composition containing the resin is applied to the lower side of the under clad layer 31 and the core layer 32, and thereafter, the over clad layer 33 is formed by the photolithography method.

Thereafter, as shown in FIG. 6H, for example, the core layer 32 is subjected to the laser processing or the cutting processing, so that the mirror surface 34 is formed in the core layer 32.

The optical waveguide 30 is fabricated by the second step.

In this manner, the opto-electric hybrid board 1 including the electric circuit board 40 and the optical waveguide 30 is obtained.

The opto-electric hybrid board 1 is an industrially available device which is circulated alone. To be specific, the opoto-electric hybrid board 1 can be circulated alone separated from an electrically connecting member 39 to be described next (ref: FIG. 6I) and the optical element 50 (ref: FIG. 3). That is, the opto-electric hybrid board 1 is a state of not constituting (producing) the opto-electric hybrid board assembly 7 yet.

As shown in FIG. 6I, thereafter, the electrically connecting member 39 is provided in the opto-electric hybrid board 1.

The electrically connecting member 39 is a member that electrically connects the terminal portion 55 to an electrode 46 to be described next, and connects them to be fixed. Examples of a material for the electrically connecting member 39 include materials that are capable of being melted by, for example, ultrasonic and pressurization. A specific example thereof includes solder. The electrically connecting member 39 is, for example, a solder ball or the like. The electrically connecting member 39 is disposed on the metal protecting layer 45 in the terminal portion 55. To be more specific, the electrically connecting member 39 is disposed at least on the front-side portion (portion facing the inclined surface 62) of the element-side terminal 25. The amount of the electrically connecting member 39 is set so that the upper end edge thereof is positioned at the same height as or at the upper side of the first surface 35.

In this manner, the opto-electric hybrid board 1 in which the electrically connecting member 39 is provided is obtained. The opto-electric hybrid board 1 in which the electrically connecting member 39 is provided is also an industrially available device which is circulated alone. To be specific, the opto-electric hybrid board 1 can be circulated alone separated from the optical element 50 to be described next (ref: FIG. 3).

Furthermore, if necessary, the external terminal 24 is electrically connected to an external circuit board (not shown).

Next, a method for producing the opto-electric hybrid board assembly 7 by using the above-described opto-electric hybrid board 1, and the opto-electric hybrid board assembly 7 are described.

In the following description, the opto-electric hybrid board assembly 7 may be simply referred to as an "assembly 7".

To produce the assembly 7, the opto-electric hybrid board 1 and the plurality of (three) optical elements 50 are prepared.

Each of the plurality of optical elements 50 has a generally rectangular flat plate shape when viewed from the top, and as shown in FIG. 3 and as blackened in FIG. 1, the optical element 50 includes two electrodes 46 and one light emission port 47.

As shown in FIG. 1, the two electrodes 46 are disposed so as to face each other at spaced intervals in both end portions in the width direction of the rear end portion on the lower surface of the optical element 50. A length between the two electrodes 46 corresponds to a gap between the two element-side terminals 25 in the optical element-mounted portion 2 corresponding to the one optical element-mounted region 4.

The electrode 46 is not provided in the front end portion of the optical element 50.

The light emission port 47 is disposed at spaced intervals to the electrode 46 at the rear side thereof. To be specific, the light emission port 47 is positioned in the central portion in the plane direction (the central portion in the front-rear direction and the central portion in the width direction) in the lower surface.

Next, the optical element 50 is held by, for example, an arm (not shown) of an ultrasonic bonding device in a state where the two electrodes 46 and the light emission port 47 face downwardly, and the optical element 50 is disposed so as to face the upper side of the optical element-mounted region 4. At this time, the optical element 50 is moved so that the light emission port 47 is overlapped with (faces) the mirror surface 34 when viewed from the top.

Subsequently, the optical element 50 is moved to the lower side, the electrode 46 of the optical element 50 is brought into contact with the electrically connecting member 39, and the rear end portion of the optical element 50 is brought into contact with the upper surface (the pedestal surface) of the support portion 56. At the same time, the optical element 50 is pressed with respect to the electrically connecting member 39 at a relatively weak force, while the ultrasonic is applied to the optical element 50. Then, the electrically connecting member 39 is melted, and subsequently, the electrically connecting member 39 is cooled to be solidified (coagulated). In this manner, the terminal portion 55 is electrically connected to the electrode 46 of the optical element 50. In this manner, the optical element 50 is electrically connected to an external circuit board (not shown) via the electric signal pattern 21 and the electrically connecting member 39. That is, the optical element 50 is brought into a state where light is capable of being emitted from the light emission port 47. In the opto-electric hybrid board 1, the lower surface of the optical element 50 is generally parallel with the plane direction of the optical element-mounted portion 2.

Meanwhile, the light emission port 47 faces the mirror surface 34 when viewed from the top, so that when the light is emitted downwardly from the light emission port 47, the light is received by the mirror surface 34 to be transmitted forwardly in the core layer 32. In this manner, the optical element 50 is optically connected to the opto-electric hybrid board 1.

Thereafter, as shown by phantom lines of FIG. 3, and phantom lines of FIG. 4, a sealing resin is provided in the thin portion 52 and the optical element 50 by, for example, application, injection, or the like. To be specific, the sealing resin fills (is incorporated in) the inside of the cover opening portion 9 so as to embed the electrically connecting member 39 and the optical element 50 and to cover the upper surface of the thin portion 52.

The sealing resin is not particularly limited, and examples thereof include curable resins having transparency such as epoxy resin and silicone resin.

Thereafter, when the sealing resin is a curable resin, the resin is cured. In this manner, a sealing portion 6 is formed.

In this manner, the assembly 7 including the opto-electric hybrid board 1, the optical element 50, the electrically connecting member 39 that electrically connects the opto-electric hybrid board 1 to the optical element 50, and the sealing portion 6 that seals the optical element 50 is produced.

In the opto-electric hybrid board 1, a front end portion 59 of the optical element 50 can be supported by the support portion 56, while the terminal portion 55 is connected to the electrode 46 in the rear end portion of the optical element 50.

The upper surface of the terminal portion 55 is positioned at the lower side with respect to the upper surface of the support portion 56, so that when the electrically connecting member 39 is provided in the terminal portion 55, and the terminal portion 55 is electrically connected to the electrode 46, the positioning of the front end portion 59 of the optical element 50 at the upper side with respect to the rear end portion can be suppressed.

Thus, the inclination of the optical element 50 can be suppressed.

As a result, the light emitted from the optical element 50 can be surely received by the mirror surface 34, and a reduction of the optical connecting reliability of the optical waveguide 30 and the terminal portion 55 can be suppressed.

In the opto-electric hybrid board 1, when the opto-electric hybrid board 1 is connected to the optical element 50, the second surface 36 is positioned away from the optical element 50 with respect to the first surface that is in contact with the optical element 50, that is, positioned at the lower side, so that the sealing portion 6 that is made by curing a curable resin can be provided between the optical element 50 and the second surface 36. Thus, when the curable resin contracts in the thickness direction at the time of curing, the optical element 50 and the second surface 36 receive a proximity force, so that the optical element 50 can be brought into tight contact with the first surface. As a result, the optical element 50 can further more surely adhere to the first surface.

According to the opto-electric hybrid board 1, a part of the base insulating layer 42 is disposed at the lower side of the terminal portion 55, and the conductive support portion 57 and the cover support portion 58 that are a part of the conductive layer 43 and a part of the cover insulating layer 44, respectively are the support portion 56 that is positioned at the lower side of the base insulating layer 42, so that the upper surface of the terminal portion 55 can be further more surely positioned at the lower side with respect to the upper surface of the support portion 56.

According to the opto-electric hybrid board 1, by an easy structure, the upper surface of the terminal portion 55 can be easily positioned at the lower side with respect to the upper surface of the support portion 56 by the base insulating layer 42 including the first base portion 53 and the second base portion 54.

In the assembly 7, the electrode 46 of the optical element 50 is electrically connected to the terminal portion 55, and the front end portion 59 of the optical element 50 is supported by the support portion 56.

The upper surface of the terminal portion 55 is positioned at the lower side with respect to the upper surface of the support portion 56, so that when the electrically connecting member 39 is provided in the terminal portion 55, and the terminal portion 55 is electrically connected to the electrode 46, the positioning of the front end portion 59 of the optical element 50 at the upper side with respect to the rear end portion can be suppressed.

Thus, the inclination of the optical element 50 can be suppressed.

As a result, the light emitted from the optical element 50 can be surely received by the mirror surface 34, and a reduction of the optical connecting reliability of the optical waveguide 30 and the optical element 50 can be suppressed.

The assembly 7 includes the scaling portion 6 that seals the optical element 50, so that the durability of the optical element 50 can be improved.

Meanwhile, the sealing portion 6 is made by curing the curable resin, so that in a case where the electric circuit board 40 does not include the support portion 56, when the curable resin contracts in the thickness direction at the time of curing, the optical element 50 receives a force in which the front end portion 59 moves toward the thickness direction. In the assembly 7, the electric circuit board 40 includes the support portion 56, so that the movement of the optical element 50 toward the lower side of the front end portion 59 can be controlled by the support portion 56.

Thus, the inclination of the optical element 50 can be surely suppressed.

Next, modified examples of the above-described one embodiment are described.

In each of the modified examples, the same reference numerals are provided for members and steps corresponding to each of those in the above-described one embodiment, and their detailed description is omitted. Each of the modified examples can be appropriately used in combination. Furthermore, each of the modified examples can achieve the same function and effect as that of the one embodiment unless otherwise specified.

As shown in FIG. 3, in the one embodiment, the lower surface of the front end portion of the optical element 50 is in direct contact with (is supported by) the first surface 35. However, for example, though not shown, a dummy electrode is provided on the lower surface of the front end portion of the optical element 50 to be used as a metal support portion, and the metal support portion can be also in direct contact with (be supported by) the first surface 35.

As shown by the phantom lines of FIG. 3 and the phantom lines of FIG. 4, in the one embodiment, the assembly 7 includes the sealing portion 6. However, for example, as shown by solid lines of FIG. 3 and solid lines of FIG. 4, the assembly 7 does not include the sealing portion 6, and the electrically connecting member 39 and the optical element 50 can be also exposed outwardly.

As shown in FIG. 4, in the one embodiment, the conductive lines 26 corresponding to the one optical element-mounted region 4 have two (the first line 27 and the second line 28). However, the number thereof is not particularly limited. For example, though not shown, the number thereof may be three or more.

As shown in FIG. 7, the conductive line 26 corresponding to the one optical element-mounted region 4 may be one. Although not shown, the conductive line 26 is positioned so as to be projected in the center in the width direction of the optical element-mounted region 4, when projected in the front-rear direction.

The one first surface 35 is provided corresponding to the one optical element-mounted region 4.

The second surface 36 is positioned at both sides in the width direction of the first surface 35.

As shown by the phantom lines of FIG. 7, the sealing portion 6 fills a space between the lower surface of the optical element 50 and the two second surfaces 36 at both sides in the width direction of the cover support portion 58.

According to the opto-electric hybrid board 1, the optical element 50 can be easily supported by an easy structure of the two (three point support) of the one first surface 35 and the two electrodes 46.

On the other hand, preferably, the number of the conductive line 26 is in plural, more preferably, the number thereof is two. When the number of the conductive line 26 is in plural, the number of the first surface 35 is in plural, and the front end portion 59 of the optical element 50 can be stably supported. Among all, when the number of the first surface 35 is two, the optical element 50 can be more stably supported by the four points of the two first surfaces 35 and the two electrodes 46.

In the one embodiment, the plurality of conductive lines 26 are disposed with the same width and the same interval as those of the plurality of wires 23. However, the plurality of conductive lines 26 and the plurality of wires 23 may be also disposed with the different width and/or interval. Preferably, the plurality of conductive lines 26 and the plurality of wires 23 are disposed with the same width and the same interval. According to the structure, the conductive support pattern 22 including the conductive line 26, and the electric signal pattern 21 including the wire 23 can be uniformly and easily formed.

Furthermore, in the one embodiment, as shown in FIG. 1, the arrangement of the conductive line 26 is overlapped with the wire 23, when projected in the front-rear direction. However, the arrangement of the conductive line 26 is not limited to the description above. For example, though not shown, the conductive line 26 may not be overlapped with the wire 23, or a part thereof is overlapped with the wire 23 and the remaining part thereof may not be overlapped with the wire 23.

As shown in FIG. 8, the width of the conductive support pattern 22 may be also relatively large. To be specific, the width of the conductive support pattern 22 is larger than that of the optical element 50. Also, the width of the first surface 35 is larger than that of the optical element 50.

In the modified example, the element-facing surface 8 does not have the second surface 36, and has the first surface 35.

However, as shown in FIG. 4, the one embodiment in which the element-facing surface 8 has the second surface 36 is preferable compared to the modified example shown in FIG. 8. According to the one embodiment, when the curable resin fills the space between the optical element 50 and the second surface 36, and the curable resin contracts, the optical element 50 is pressed (energized) toward the second surface 36 (the lower side). Thus, the optical element 50 can be further more surely in contact with the first surface 35.

As shown in FIG. 4, in the one embodiment, the support portion 56 includes the conductive support portion 57 and the cover support portion 58. Meanwhile, as shown in FIG. 9, the support portion 56 can also include the cover support portion 58 without including the conductive support portion 57. The support portion 56 preferably consists of only the cover support portion 58.

To form the cover support portion 58, first, as shown in FIG. 11A, the conductive layer 43 is formed in a pattern having the electric signal pattern 21 without having the conductive support pattern 22 (ref: right-side view of FIG. 5C).

As shown in FIG. 11B, next, the cover insulating layer 44 is formed.

As shown in FIG. 11C, thereafter, a part of the cover insulating layer 44 is removed by etching (dry etching or the like) or the like, so that the cover support portion 58 is formed.

As shown in FIGS. 2 and 3, in the one embodiment, the rear end surface of the conductive line 26 (the conductive support pattern 22) is continuous to the rear end surface of the cover insulating layer 44. However, as shown in FIG. 12, the rear end surface of the conductive line 26 can be also covered with the cover insulating layer 44.

According to this, the possibility of a short circuit between the conductive line 26, and the electrically connecting member 39 and the optical element 50 can be reduced.

As referred to FIG. 1 and shown in FIG. 13, in the electricity transmission region 5, the base insulating layer 42 can be defined as the thin portion 52.

The thin portion 52 is formed over the optical element-mounted region 4 and the electricity transmission region 5.

All of the electric signal patterns 21 (the wire 23, the external terminal 24, and the element-side terminal 25) are provided on the upper surface of the thin portion 52.

As shown in FIG. 14, the base insulating layer 42 can also have the thick portion 51 without having the thin portion 52. The base insulating layer 42 has the uniform thickness T2.

The element-side terminal 25 is provided on the upper surface of the thick portion 51.

As shown in FIG. 2, in the one embodiment, the thin portion 52 has an inclined surface at the peripheral end edge thereof. However, though not shown, the thin portion 52 can also have the uniform thickness T1 without having the inclined surface.

In the one embodiment, as shown in FIG. 1, the one optical element 50 is provided in the one opto-electric hybrid board 1. However, as shown in FIG. 15, the number thereof may be in plural.

Furthermore, the number of the electrode 46 with respect to the one optical element 50 is not limited, and for example, the number thereof may be a single. Also, as shown in FIG. 15, the number thereof may be three or more (for example, six or the like).

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The opto-electric hybrid board is included in the assembly.

DESCRIPTION OF REFERENCE NUMERALS

1 Opto-electric hybrid board
6 Sealing portion
7 Assembly
8 Element-facing surface
25 Element-side terminal
34 Mirror surface 30 Optical waveguide
35 First surface
36 Second surface
40 Electric circuit board
42 Base insulating layer
43 Conductive layer
45 Metal protecting layer
50 Optical element
53 First base portion
54 Second base portion
55 Terminal portion
56 Support portion
57 Conductive support portion
58 Cover support portion
59 Front end portion (one example of one end portion in the first direction)

The invention claimed is:

1. An opto-electric hybrid board comprising:
an optical waveguide and an electric circuit board sequentially provided upwardly in a thickness direction of the opto-electric hybrid board, wherein
the opto-electric hybrid board is for optically and electrically connecting an optical element having an electrode at one end portion in a longitudinal direction perpendicular to the thickness direction, and emitting light from a space between the one end portion and an opposite end portion in the longitudinal direction, and
the electric circuit board includes
a terminal portion to be electrically connected to the electrode and
a support portion comprising an insulating layer as an uppermost surface that supports the opposite end portion of the optical element in the longitudinal direction of the optical element;
the optical waveguide includes a light receiving portion for receiving light emitted from the optical element;
the light receiving portion is positioned between the terminal portion and the support portion, when projected in the thickness direction; and
an uppermost surface of the terminal portion is positioned below the uppermost surface of the support portion when viewed in the thickness direction.

2. An opto-electric hybrid board comprising:
an optical waveguide and an electric circuit board sequentially provided upwardly in a thickness direction of the opto-electric hybrid board, wherein
the opto-electric hybrid board is for optically and electrically connecting an optical element having an electrode at one end portion in a longitudinal direction perpendicular to the thickness direction, and emitting light from a space between the one end portion and an opposite end portion in the longitudinal direction, and
the electric circuit board includes
a terminal portion to be electrically connected to the electrode and
a support portion that supports the opposite end portion of the optical element in the longitudinal direction of the optical element;
the optical waveguide includes a light receiving portion for receiving light emitted from the optical element;
the light receiving portion is positioned between the terminal portion and the support portion, when projected in the thickness direction;
an uppermost surface of the terminal portion is positioned below an uppermost surface of the support portion when viewed in the thickness direction, wherein
on condition that the opto-electric hybrid board is connected to the optical element, the electric circuit board has a facing surface that faces the optical element in the thickness direction, and
the facing surface has
a first surface that includes the uppermost surface of the support portion and is in contact with the optical element and
a second surface that includes the uppermost surface of the terminal portion and is positioned away from the optical element with respect to the first surface.

3. The opto-electric hybrid board according to claim 2, further comprising an electrically conducting member disposed between the uppermost surface of the terminal portion and the optical element.

4. The opto-electric hybrid board according to claim 3, wherein the electrically conducting member comprises a solder ball.

5. An opto-electric hybrid board comprising:
an optical waveguide and an electric circuit board sequentially provided upwardly in a thickness direction of the opto-electric hybrid board, wherein
the opto-electric hybrid board is for optically and electrically connecting an optical element having an electrode at one end portion in a longitudinal direction perpendicular to the thickness direction, and emitting light from a space between the one end portion and an opposite end portion in the longitudinal direction, and
the electric circuit board includes
a terminal portion to be electrically connected to the electrode and
a support portion that supports the opposite end portion of the optical element in the longitudinal direction of the optical element;
the optical waveguide includes a light receiving portion for receiving light emitted from the optical element;
the light receiving portion is positioned between the terminal portion and the support portion, when projected in the thickness direction; and
an uppermost surface of the terminal portion is positioned below an uppermost surface of the support portion when viewed in the thickness direction, wherein
the electric circuit board includes a base insulating layer, a conductive layer having a terminal, and a cover insulating layer exposing the terminal sequentially provided upwardly in the thickness direction;
the terminal portion includes the terminal;
a part of the base insulating layer is disposed below the terminal portion;
and a part of the conductive layer and the cover insulating layer is the support portion.

6. The opto-electric hybrid board according to claim 5, wherein
the base insulating layer includes
a first base portion facing the terminal portion in the thickness direction and
a second base portion facing the support portion in the thickness direction, and
the first base portion is thinner than the second base portion.

7. An opto-electric hybrid board assembly comprising:
an opto-electric hybrid board comprising:
an optical waveguide and an electric circuit board sequentially provided upwardly in a thickness direction of the opto-electric hybrid board, wherein
the opto-electric hybrid board is for optically and electrically connecting an optical element having an electrode at one end portion in a longitudinal direction perpendicular to the thickness direction, and emitting light from a space between the one end portion and an opposite end portion in the longitudinal direction, and the electric circuit board includes a terminal portion to be electrically connected to the electrode and a support portion that supports the opposite end portion of the optical element in the longitudinal direction of the optical element;

the optical waveguide includes a light receiving portion for receiving light emitted from the optical element;

the light receiving portion is positioned between the terminal portion and the support portion, when projected in the thickness direction; and an uppermost surface of the terminal portion is positioned below an uppermost surface of the support portion when viewed in the thickness direction; and the optical element having the electrode at one end portion in the longitudinal direction perpendicular to the thickness direction of the opto-electric hybrid board and emitting light from the space between the one end portion and the opposite end portion in the longitudinal direction, wherein the electrode of the optical element is electrically connected to the terminal portion, and the opposite end portion in the longitudinal direction of the optical element is supported by the support portion.

8. The opto-electric hybrid board assembly according to claim 7 further comprising:

a sealing portion sealing the optical element, wherein the sealing portion is made by curing a curable resin.

* * * * *